(12) United States Patent
Chimoto

(10) Patent No.: US 6,532,590 B1
(45) Date of Patent: Mar. 11, 2003

(54) APPARATUS AND METHOD OF DISPLAYING ELECTRONIC PREVIEW GUIDE

(75) Inventor: Hiroyuki Chimoto, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/301,160

(22) Filed: Apr. 28, 1999

(30) Foreign Application Priority Data

Apr. 28, 1998 (JP) ............................................ 10-119630

(51) Int. Cl.⁷ ................................................. G06F 3/00
(52) U.S. Cl. ........................................... 725/43; 725/47
(58) Field of Search ............................. 725/39, 43, 47; 345/821, 822, 825, 859, 860, 861

(56) References Cited

U.S. PATENT DOCUMENTS

| | | | | |
|---|---|---|---|---|
| 5,212,477 A | * | 5/1993 | Indekeu et al. ............ | 340/7.55 |
| 5,812,123 A | * | 9/1998 | Rowe et al. ................ | 345/721 |
| 6,005,601 A | * | 12/1999 | Ohkura et al. ............. | 348/906 |
| 6,028,600 A | * | 2/2000 | Rosin et al. ................ | 345/718 |
| 6,412,110 B1 | * | 6/2002 | Schein et al. .............. | 345/38 |

FOREIGN PATENT DOCUMENTS

| | | |
|---|---|---|
| EP | 0 798 921 A | 10/1997 |
| JP | 09200580 | 7/1997 |
| JP | 09219819 | 8/1997 |
| JP | 9-270969 | 10/1997 |

* cited by examiner

Primary Examiner—Andrew Faile
Assistant Examiner—Jason Chung
(74) Attorney, Agent, or Firm—Pillsbury Winthrop LLP

(57) ABSTRACT

An electronic preview guide (EPG) display apparatus for use in a broadcast receiver, for selectively presenting viewers a broadcast schedule. The broadcast schedule is presented in a grid pattern with one or more rows each showing a TV channel number or a TV station name and an array of slots containing preview guide messages of its broadcast schedule extending in the direction of time axis, using a preview guide data broadcast by each broadcast station and a present time. The apparatus includes a display controller for making an EPG slot at the present time or a viewer-designated time wider than other slots within the EPG screen.

12 Claims, 27 Drawing Sheets

APPARATUS AND METHOD OF DISPLAYING ELECTRONIC PREVIEW GUIDE

FIELD OF THE INVENTION

The present invention generally relates to an electronic preview guide display system for use in digital broadcast receivers, for providing viewers broadcast program information.

BACKGROUND OF THE INVENTION

Recent development of the digital technologies in the broadcast industry has permitted digital satellite broadcast to come into service in many countries. One feature of the digital broadcast is directed to increasing broadcast channels, i.e., multi-channel broadcasting. According to the capability of multi-channel broadcasting, more and more the specific channels, for instance channels serving movie film programs or news for all day, are increasing. Thus it becomes convenient for viewers to enjoy a wide variety of programs.

However, the increase of channels makes it harder for viewers to easily find out about what programs are showing or will be showed in the plurality of channels.

Digital satellite broadcasts in Japan and the United States, or CATVs serving multi-channels in analog systems though, in the United States, have an accompanying preview channel for an EPG (Electric Preview Guide) data service to give viewers information regarding broadcast programs.

The EPG data is displayed in a grid pattern or a two-dimensional matrix with an axis listing channel numbers of TV station names (hereinafter referred to as a channel-list axis) and a time-axis listing program titles to be broadcast. However, the time-axis of the EPG screen is limited to the information of programs two hours ahead from the present time. The viewer cannot tell what programs will be broadcast thereafter. Further, along with the capability of the multi-channel broadcast of the program information, the number of TV channels to be listed should be increased. However due to the limitation of the display size, the number of the capable channels available on one screen would be in a range of 6 to 8. So that, a viewer has to many times operate scroll to search over or reach a program information of his/her interest.

As described above, the conventional electronic preview guide display system had a problem that it only shows program information within two or three hours in the direction of the time-axis, and about six to eight channels in the direction of the channel-list axis, so that it imposed a considerable inconvenience on viewers.

SUMMARY OF THE INVENTION

In consideration of the above problem, the present invention has been made, and an object of the present invention is to provide an electronic preview guide display system capable of increasing an amount of information given in at least one of the directions of the time-axis direction and the channel-list axis of an EPG screen, while in a pattern easily readable for viewers.

In order to achieve the above object, an electronic preview guide display apparatus for use in a broadcast receiver, selectively presents viewers its broadcast schedule, in a grid pattern with one or more rows each showing a TV channel number or a TV station name and an array of slots containing preview guide messages of its broadcast schedule extending in the direction of time axis, by using a preview guide data broadcast by each broadcast station and a present time. The apparatus is provided with a display controller for making EPG slot at the present time or a viewer-designated time wider than other slots within the EPG screen.

Accordingly, viewers can easily view information of programs at a time, of a TV channel number or a broadcast station that they wish. In addition, the electronic preview display apparatus can display information of programs by compressing the size of other slots.

In the case, by using the non-linear logarithm characteristics in the change of the time-axis, or the change of the line width in the direction of the channel-list axis, viewers can view the display in a natural visual form. So that, viewers can perform a channel selection in agreeable to the occasion.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3b is a diagram showing three patterns of non-linear change characteristics applicable to the EPG screen of FIG. 3a;

FIG. 6b is a diagram showing three patterns of non-linear change characteristics applicable to the EPG screen of FIG. 6a;

FIG. 9b is a diagram showing the relation between the non-linear logarithmic curve and the size of the EPG slots applied to the EPG screen of FIG. 9a;

FIG. 12b is a diagram showing the relation between the non-linear logarithmic curve and the size of the EPG slots applied to the EPG screen of FIG. 12a;

FIG. 15b is a diagram showing three patterns of non-linear change characteristics applicable to the EPG screen of FIG. 15a.

FIG. 21b is a diagram showing the relation between the non-linear logarithmic curve and the size of the EPG slots applied to the EPC screen of FIG. 12a;

FIG. 24b is a diagram showing the relation between the non-linear logarithmic curve and the size of the EPG slots applied to the EPG screen of FIG. 24a;

DESCRIPTION OF THE PREFERRED EMBODIMENTS

The present invention will be described in detail with reference to the FIGS. 1 through 27.

Figure 1:
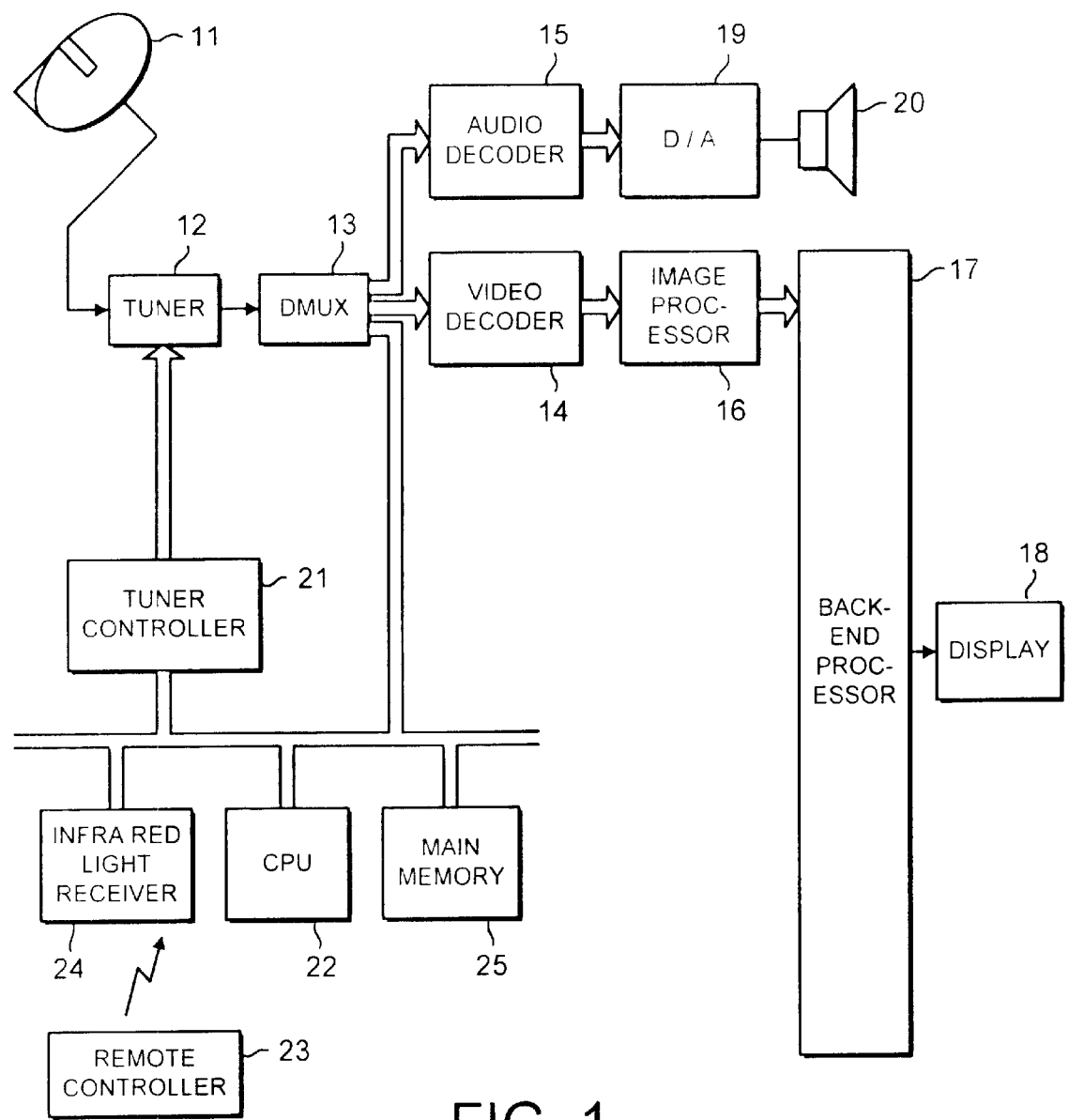
FIG. 1 is a slot diagram showing a construction of the TV receiver to which the present invention is applied.

FIG. 1 shows a general TV receiver having a EPG screen system, according to a first embodiment of the present invention. In FIG. 1, a TV signal received by an antenna 11 is input to a tuner 12. The tuner 12 selects a channel that the viewer wishes to see. Here the channel selection is carried out through operations on a remote controller by the viewer. An output signal from the tuner 12 is applied to a demultiplexer (DMUX) 13. The demultiplexer 13 demultiplexes the signal into a video stream, an audio stream, and a data stream. The video data is applied to a video decoder 14, while the audio data is applied to an audio decoder 15. The decoded video signal is processed in an image processor 16, and then applied to a back-end processor 17. An output from the back-end processor 17 is supplied to a display 18 and displayed thereon. An output from the audio decoder 15 is converted to an analog signal using a digital/analog converter (D/A) 19, and then supplied to a speaker 20.

In the case of displaying the EPG screen, the tuner 12 is connected to a tuner controller 21. The tuner controller 21 controls the tuner 12 to select channels in a round-robin fashion at prescribed periods. The tuner 12 takes a TV signal of each channel under the control of the tuner controller 21 and then supplies the TV signal to the demultiplexer 13. The demultiplexer 13 demultiplexes the TV signal to a video stream and a data stream. The video stream is then forwarded to a video decater 14, while the data stream is forwarded to a CPU 22.

When the video data is processed in an MPEG format, the video decoder 14 decodes only I-frames for presenting an opening stage rough. The I-frame video data are then supplied to an image processor 16. The image processor 16 processes the input video data so as to present a predetermined size of EPG screen. A back-end processor 17 receives the output of the image processor 16 and then displays the video data on a display 18.

When a viewer instructs the receiver to display the EPG screen through a remote controller 23, an infrared light receiver 24 coupled to the remote controller 23 transfers the instruction signal to a CPU 22. Then the CPU 22 extracts EPG data from the data stream and stores them in a main memory 25. The EPG data are then supplied to a video decoder 14 for developing the EPG screen on the display 18. In receipt of the EPG data, the video decoder 14 changes from a normal program display mode to the EPG screen display mode, and then displays the EPG screen on the display 18 through the image processor 16 and the back-end processor 17.

Figure 2:
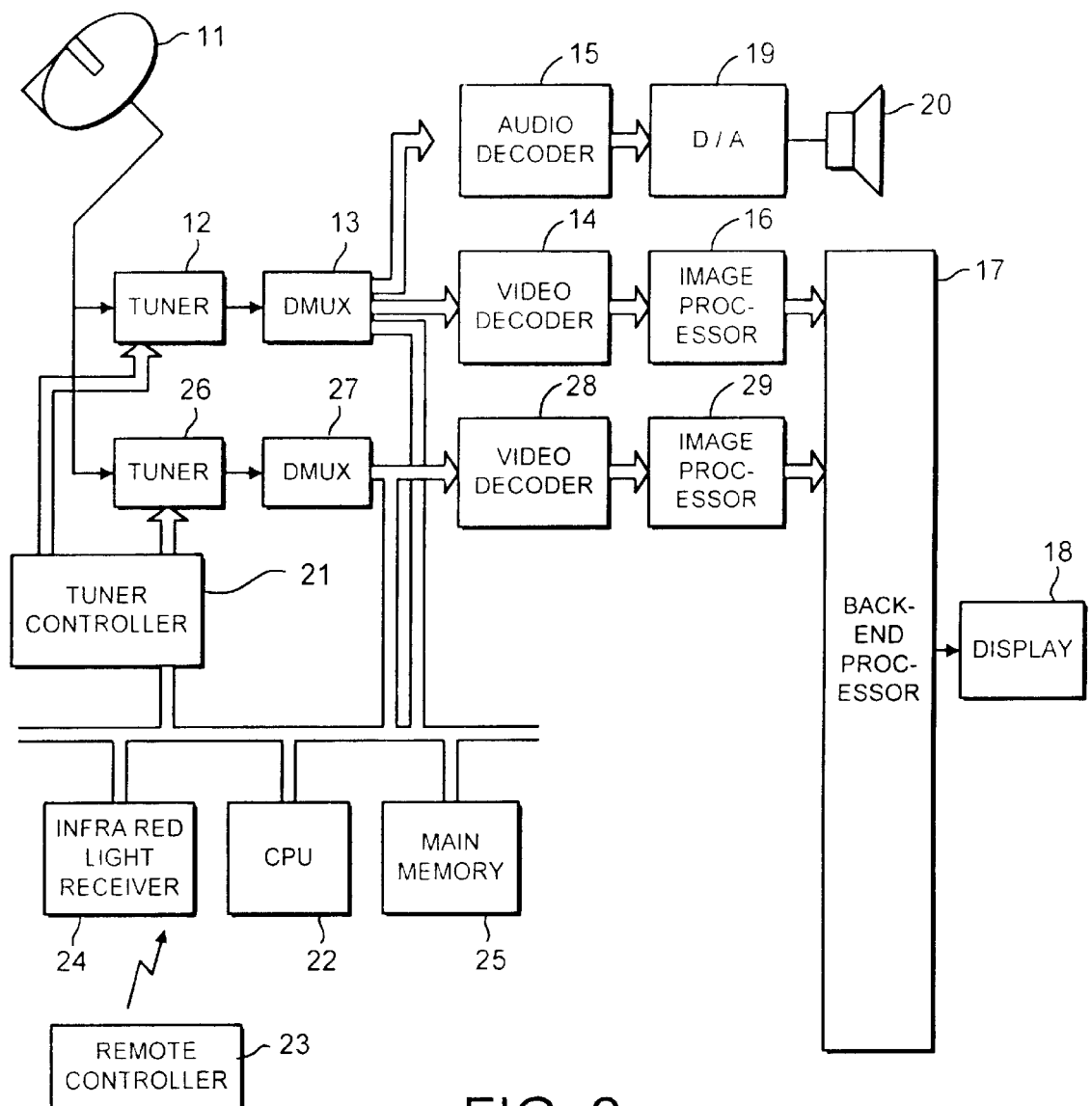
FIG. 2 is a slot diagram showing the construction of the TV receiver having a double-window display function to which the present invention is applied.

FIG. 2 shows a slot diagram of a TV receiver having a double-window function and an EPG screen system according to the present invention. Here, in FIG. 2, same elements as those shown in FIG. 1 are assigned with the same reference numerals or symbols, and only the different parts will be explained hereinafter.

In FIG. 2, a TV signal received by an antenna 11 is also input to a tuner 26. The tuner 26 performs a back-end processing in place of the tuner 12. The tuner 26 is coupled to a tuner controller 21 for an EPG operation. The tuner controller 21 controls the tuner 26 to select several channels in each specific period. The tuner 26, according to the control, takes the TV signals of each channel and inputs it to the demultiplexer (DMUX) 27. The demultiplexer 27 demultiplexes its input signal into a video stream and a data stream. The video stream is forwarded to a video decoder 28, while the data stream is forwarded to a CPU 22.

The video decoder 28 decodes only I-frame contained in an MPEG data to display a preview screen of the EPG data. The decoded image data are supplied to an image processor 29. The image processor 29 stores the input image data into its internal memory, after compressing the image data in relation to its horizontal and vertical scales.

When a viewer instructs an EPG screen operation for the receiving through a remote controller 23, the instruction is passed to the CPU 22 via an infrared light receiver 24. The CPU 22 issues a command for instructing the back-end processor 17 to divide the screen, and at the same time issues a command for instructing the image processor 29 to compress the horizontal size of the image size into a half. In receipt of the commands, the back-end processor 17 divides the screen into two sub-screens, assigning the left sub-screen to display usual programs, and the right sub-screen to display an EPG screen. At the same time, the image processor 16 compresses the horizontal size of the image data output from the decoder 14 into a half.

Then, the CPU 22 extracts the EPG data from the data stream and stores them in a main memory 25. The EPG data are then developed to an EPG screened data and pass the screen data to the video decoder 28. In receipt of the screen data, the video decoder 28 changes the operation of the receiver from the usual program display mode formerly displayed to the EPG screen mode. Then the EPG screen is displayed in the right half of the display 18 through the image processor 16 and the back-end processor 17.

Figure 3A:
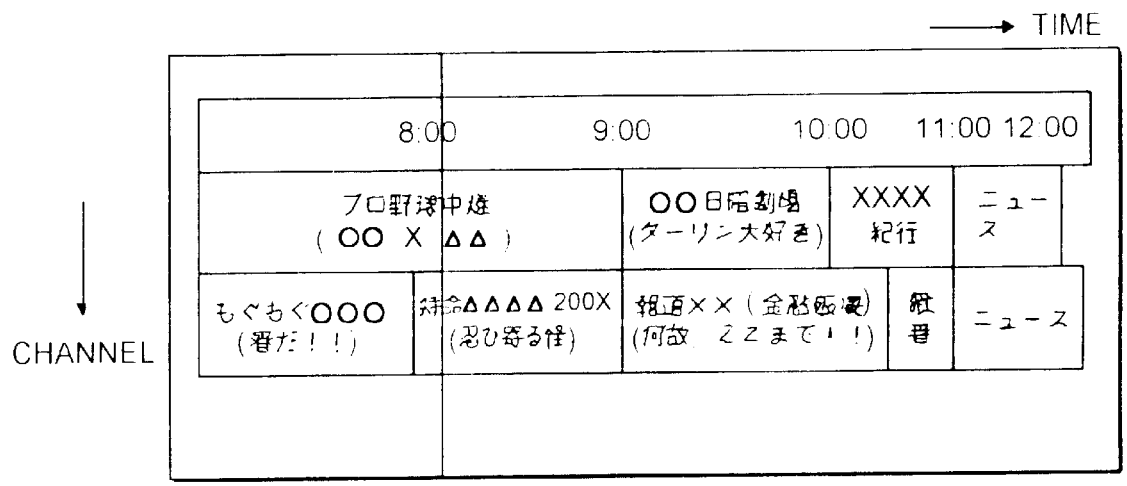
FIG. 3a is a diagram showing a EPG screen according to a first embodiment.
Figure 3B:
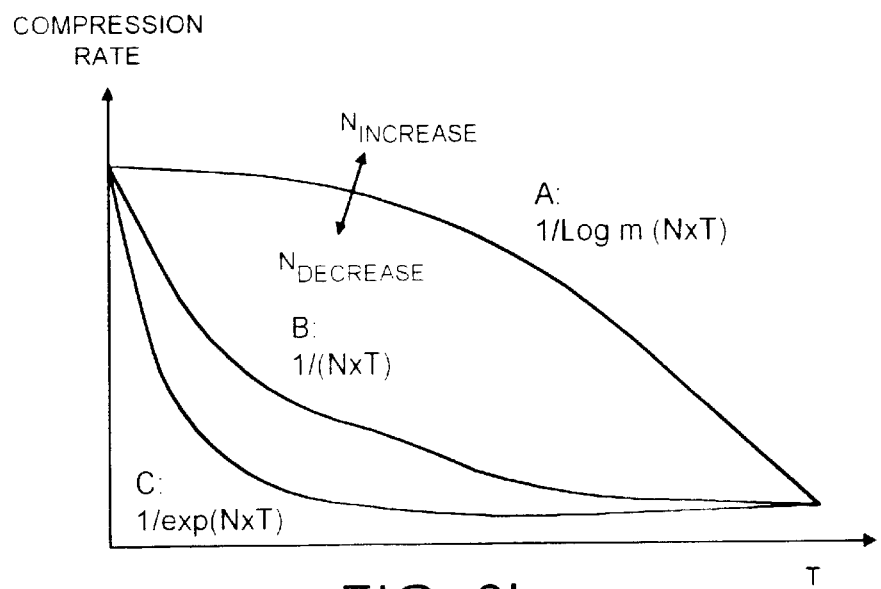
Figure 4:
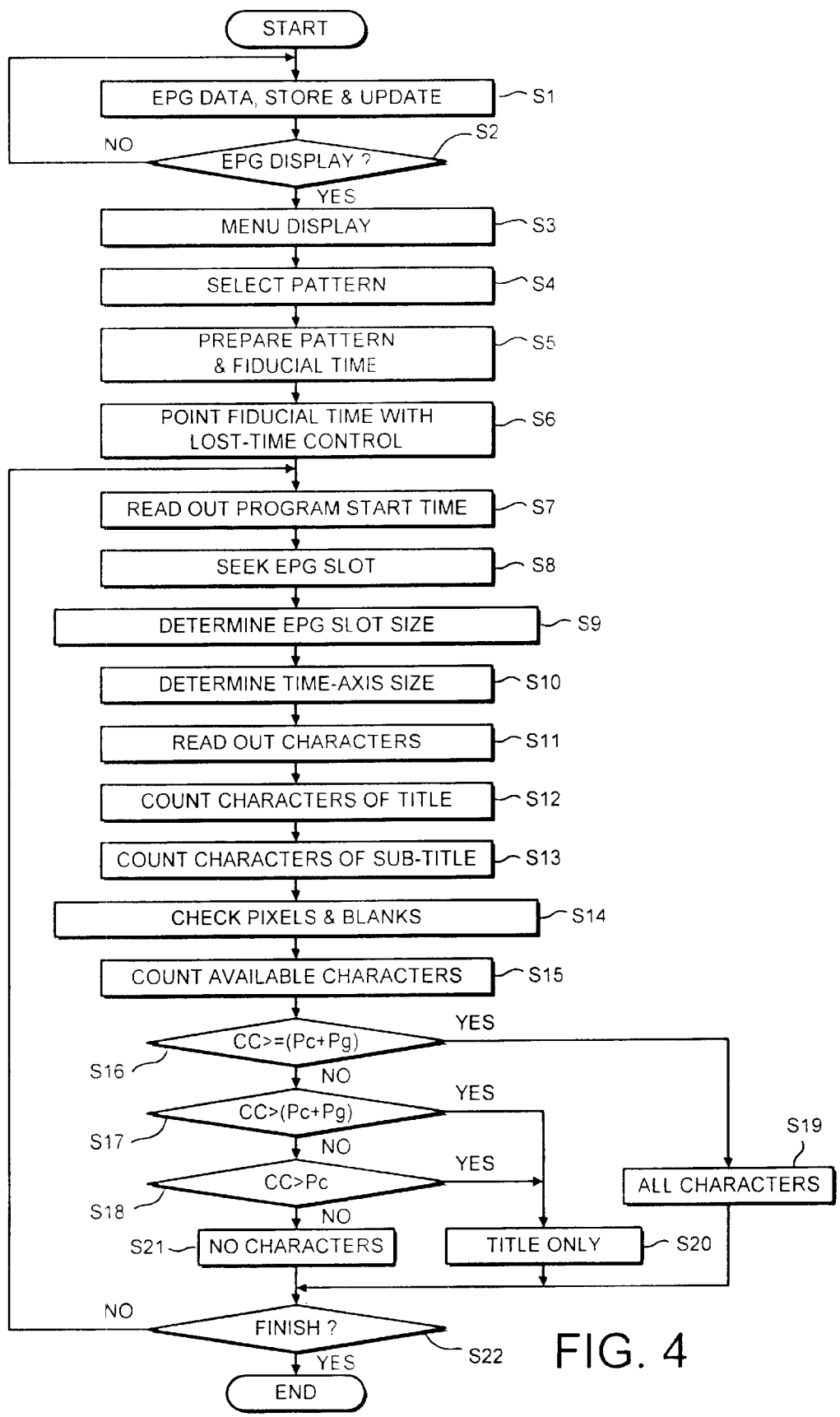
FIG. 4 is a flowchart showing the steps of the EPG screen processing according to the first embodiment.
Figure 5:
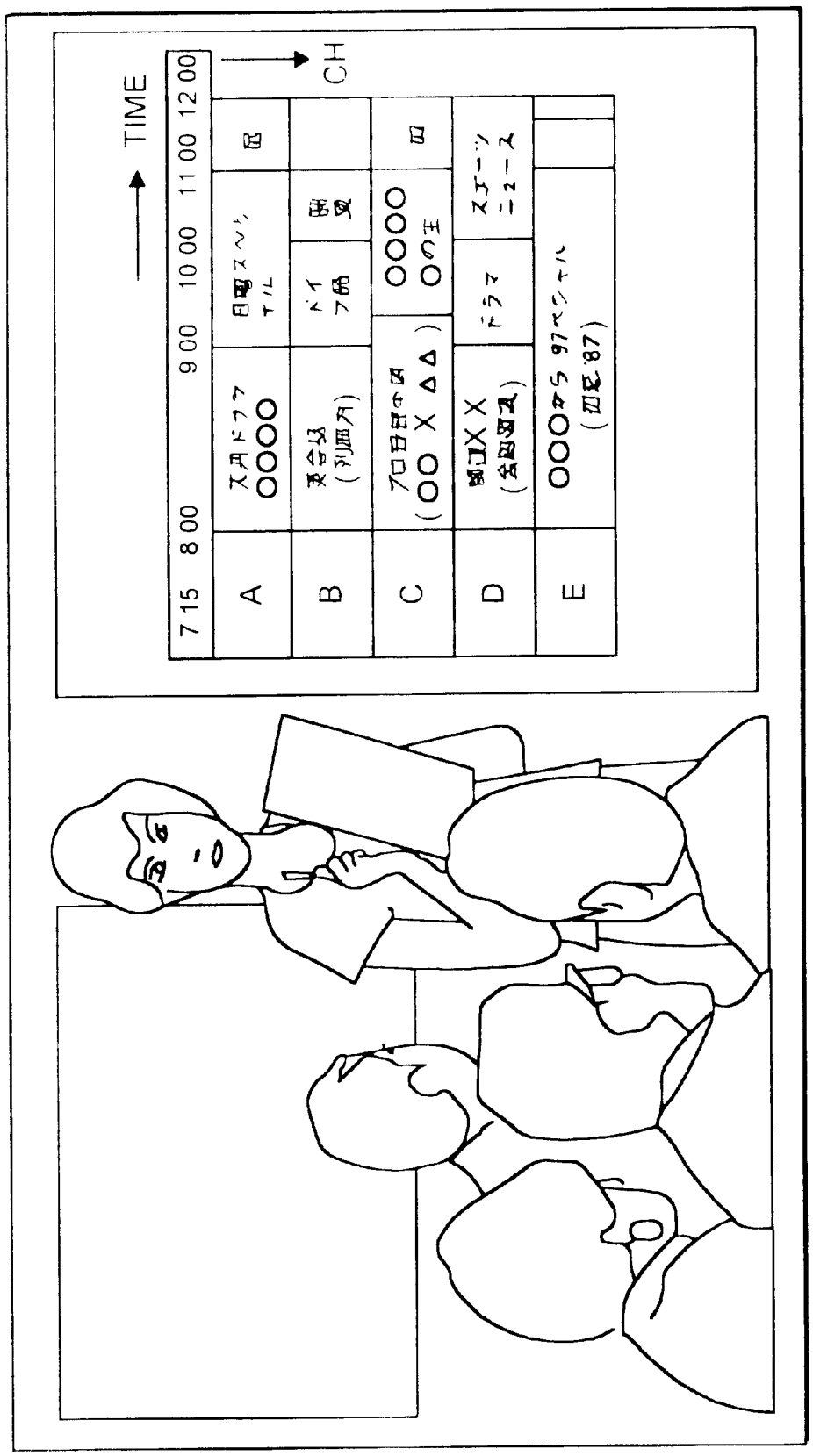
FIG. 5 is a diagram showing another example of the EPG screen applied to a double-window display according to the first embodiment.

Referring now to FIGS. 3 to 5, the manner to display the EPG screen according to the first embodiment of the present invention will be explained in relation to the above construction.

According to the present inventions, it is characterized by that the EPG screen is presented by using a non-linear logarithm change characteristics. So, in this invention the EPG screen has slots changed their size in the direction of the time-axis is accordance with the non-linear logarithm characteristics.

FIG. 3a shows an example of the EPG screen for one TV station which serves two channels. In the EPG screen two lines of channel information are aligned in the vertical direction. Each line has a plurality of EPG slots in the order of time running in the horizontal direction (time axis direction). The example of the EPG screen is characterized by that size of the EPG slots change gradually in a non-linear manner in the direction of the time axis. FIG. 3b shows three patterns of curves A; $1/Log_m(NXT)$, B; $1/(NXT)$, and C; $1/exp\,(NXT)$, as the examples of the non-linear change characteristic. In FIG. 3a the EPG screen is presented based on the curve A. Here, it is a matter of course that the EPG screen can be presented based on either one of the other curves B or C.

In FIG. 3A, a hair-line cursor is displayed on the EPG screen. By designating the right of the left in relation to the cursor, a viewer can scroll the EPG screen to the designated direction. While increasing the distance from the hair-line cursor in the time axis direction, the size of the slots decreases in accordance with the curve A, as shown in FIG. 3b. Accordingly, a large amount of EPG slots can be packed in the limited space of the EPG screen, in comparison to conventional EPG screens having a linear scale of time axis. In this case, since the time axis had the non-linear logarithmic change, the EPC screen is presented in a natural visual form for viewers, so that they can perform a channel selection.

Here there arises a problem that the amount of characters available in each EPG slot decreases as the slot size becomes smaller. To solve the problem, as the EPG slots become smaller, sub-titles are eliminated from the reduced-size slots. As the slots further reduced in-size, main titles, for instance, are recapped.

FIG. 4 shows the flow of operation steps for displaying the non-linear patterned EPG screen. In FIG. 4, the EPG data from the TV station and the present time data are updated and stored in the step S1. When the viewer selects the EPG screen (step S2), a menu screen listing display patterns is presented (step S3). The viewer then selects his/her favorite display pattern (step S4). A non-linear processing routine corresponding to the selected display pattern is prepared, and a time defining a fiducial (or the present time, at the beginning) is read out from the main memory 25 (step S5). A shown in FIG. 3a, the fiducial time is pointed by a hair-line cursor (step S6). Here the initial value of the fiducial time is set to the present time.

On the other hand, a start time Ts of each program is extracted from the EPG data (step S7). In relation to the start time Ts, the time different TD from the start time Ts to the present time T1 is obtained by the following equation 1.

$$Td=Ts-T1 \tag{1}$$

Next, the size of the EPG slot DS is sought (step S8). This seek operation can be carried out to present the EPG screen on either the right or the left screen not but on a whole screen as shown in FIG. 3a, for example in a TV receiver with a high performance function like the double-window system as shown in FIG. 2. FIG. 5 shows an example of such a double-window display. Here, in FIG. 6, slots A and E are allotted for channel numbers (or TV station names).

When a viewer selects the non-linear logarithmic change characteristics for the EPG screen after the time difference Td and the size of the EPG slot DS have been determined, the size of a given EPG slot is determined by the following equations (step S9). Here, the base m of the logarithmic function Log is set to 10, while its coefficient N is also set to 10.

$$Px=DS/Max \text{ (Pixel Number)} \times (1/Log_{10}(N \times Td)) \tag{2}$$

Herein "Pixel Number" represents the number of effective display pixels in a line. For instance, in the case that the EPG screen is displayed on a whole screen, the slot position for a program starting after one hour is determined as follows.

$$Px=1 \times (1Log_{10}10 \times 1)=1$$

Further the slot position for a program starting after two hours is determined as follows.

$$Px=1 \times (1/Log_{10}10 \times 2)=0.77$$

Next, the actual size of the EPG slot in the time-axis direction is determined based on the basic size Psz (step S10). For instance, for the case of 200 Pixel, the size Pu of the EPG slot in the time-axis direction for a program starting after two hours is given by the following equation 3.

$$Pu=Px \times Psz=0.77 \times 200=154 \tag{3}$$

Next, based on the size of the EPG slot determined by the equation 3, it is checked how many characters can be placed in the slot. Then based on the result available characters are displayed in the EPG slot. Referring back to FIG. 4, the flow of the above-described operation will be described.

Further, a character string such as a program title is extracted from the EPG data (step S11). A number of characters Pc in the program title is then counted (step S12). Further, a number of characters Pg in additional information such as a sub-title counted (step S13). At this time, for the number of characters Pc obtained in the step S12, the number of displayable characters is checked from the size Pu determined by the equation 3.

First in this operation, in the case that the character size is fixed, the pixel size Cs of the character in the X direction (i.e., the time-axis direction of the EPG screen) is checked (step S14). When a gap (blank Gp is required between characters, the size Cp of each character including the gap Gp in the X direction will be determined by the following equation 4 (step S14).

$$Cp=Cs+Gp \quad (4)$$

Then the number of displayable characters CC is determined by dividing the slot size Pu determined by the equation 3 by the character size Cp determined by the equation 4, as shown by the following equation 5 (step S15)

$$CC=Pu/Cp \quad (5)$$

Then a character string available in the EPG slot is decided steps S19, S20, and S21) by comparing the number of characters Pc (or Pc+Pg) obtained in the step S12 with the number of displayable characters CC calculated by the equations 5 (steps S16, S17, and S18).

If "CC>=(Pc+Pg)" is positive (step S16), then a whole character string display will be carried out (step S19).

If "CC<(Pc+Pg)&&CC>=PC" is positive (step S17), only a program title display will be carried out (step S20).

If "CC<PC" is positive (step S18), no character display will be carried out (step S21).

Then, it is determined whether the character display processing has been carried out for EPG slots. If there remains any EPG slot unfinished the character presentation, the operation repeats the routine on and after the step S7(step S22).

As is evident from the flow of steps as described above, the present embodiment can provide an EPG screen presenting a lot of program information for a long time due to that the size of the EPG slots varies in the time-axis direction. Especially, since the size of the EPG slots varies with the non-linear logarithmic function, viewers can view the screen in agreeable to the occasion.

Now a second embodiment of the present invention will be explained hereinafter. This second embodiment is different from the first embodiment by that the size of the characters are variable.

Figure 6A:
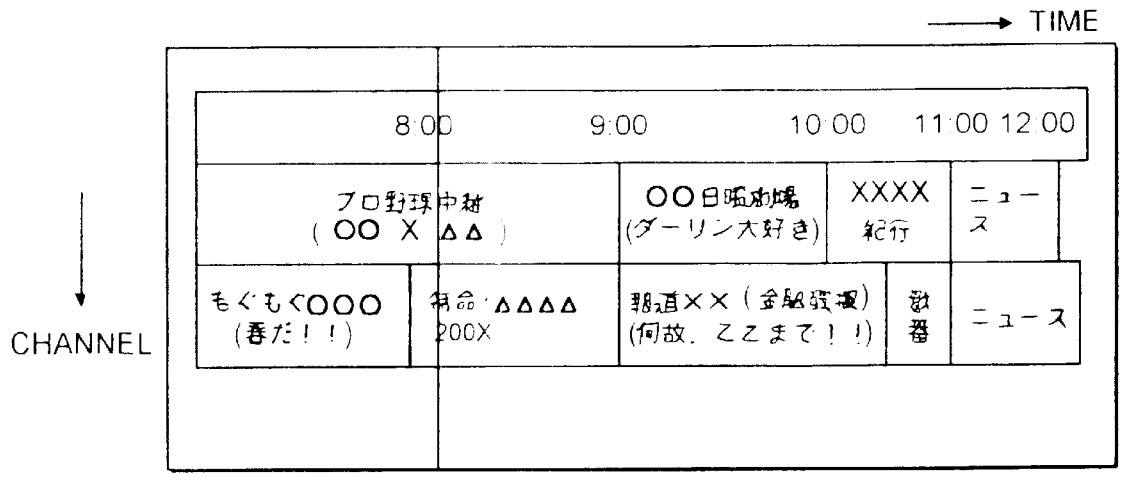
FIG. 6a is a diagram showing the EPG screen according to a second embodiment.
Figure 6B:
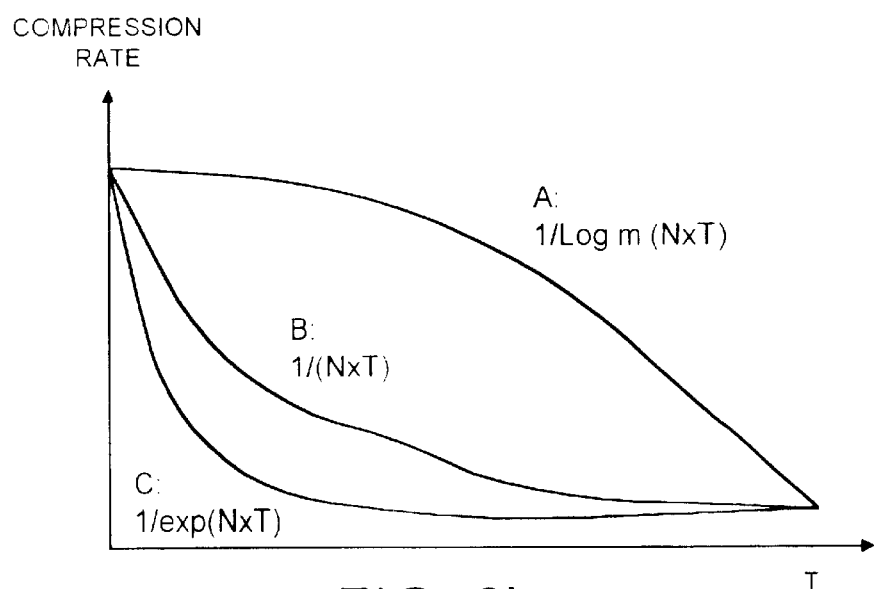
Figure 7:
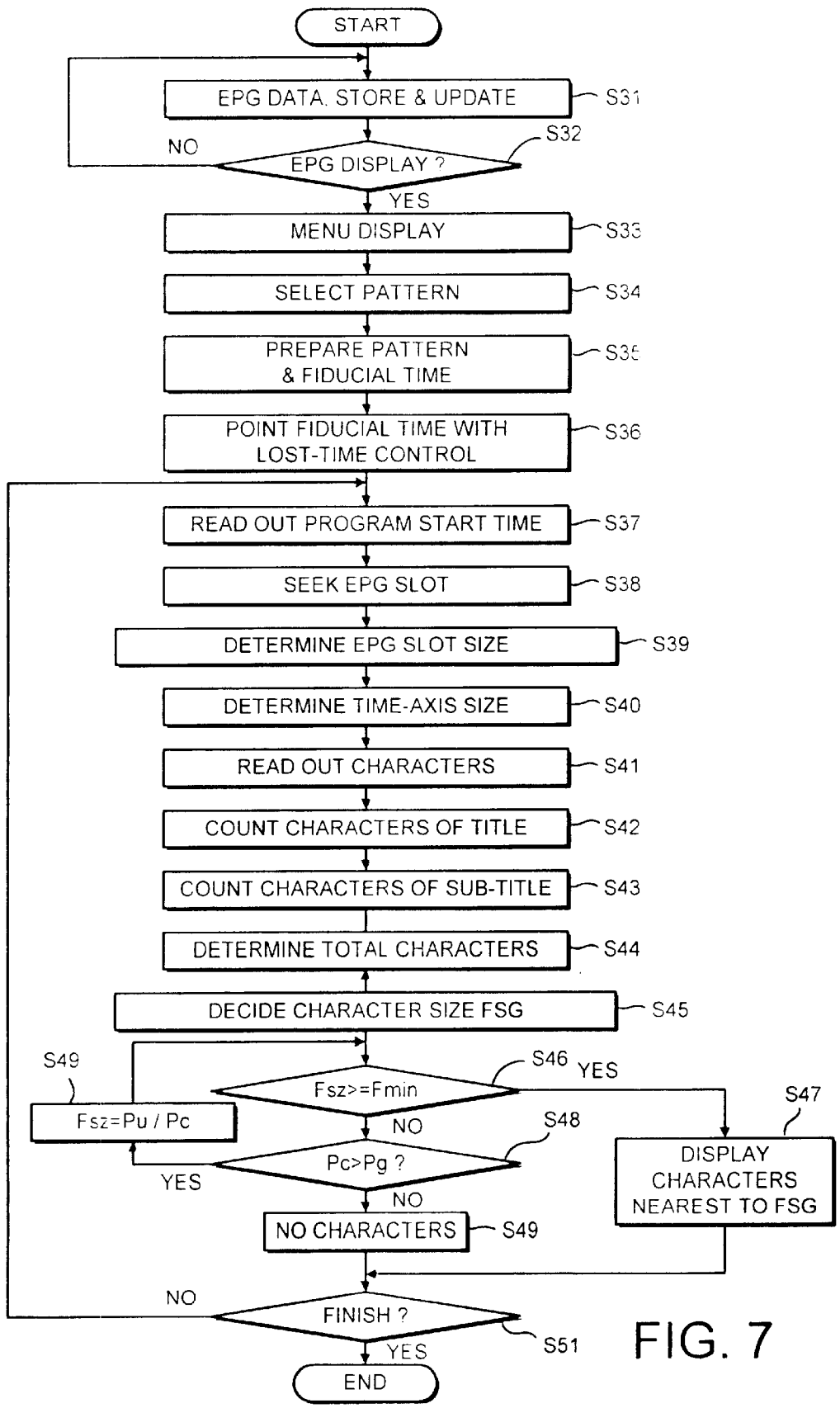
FIG. 7 is a flowchart showing the steps of the EPG screen processing according to the second embodiment.

FIGS. 6a and 6b show an example in which the size of the EPG slots is compressed in a non-linear manner in the time-axis direction, and that the character size varies in accordance with the size of the EPG slot. FIG. 6a shows the EPG screen according to this second embodiment and FIG. 6b shows three patterns of non-linear change characteristics. FIG. 7 shows the flow of operation steps for displaying the non-linear patterned EPG screen according to the second embodiment.

In FIG. 7, the EPG data from the TV station and the present time data are updated, and stored in the step S31. When the viewer selects the EPG screen (step S32), a menu screen listing display patterns is presented (step S33). The viewer then selects his/her favorite display pattern (step S34). A non-linear processing routine corresponding to the selected display pattern is prepared, and a time defining a fiducial (or present time, at the beginning) is read out from the main memory 25 (step S35). As shown in FIG. 6a, the fiducial time is indicated by a hair-line cursor (step S36). Here the initial value of the fiducial time is set to the present time.

A start time Ts of each progrma is extracted from the EPG data (step S37). In relation to the start time Ts, the time difference Td from the start time Ts to the present time T1 is obtained by the following equation 1.

$$Td=Ts-T1 \quad (6)$$

Figure 8:
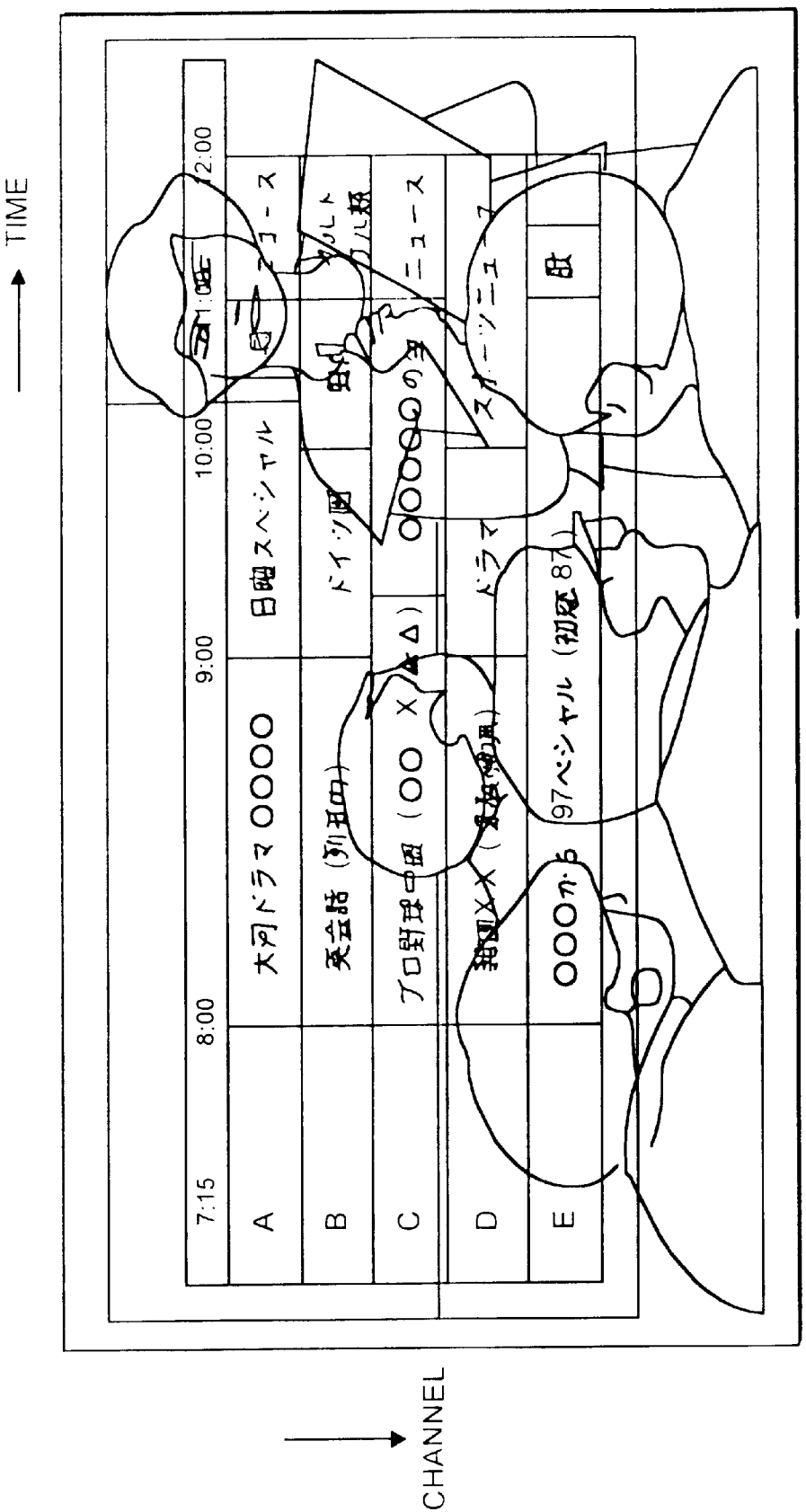
FIG. 8 is a diagram showing another example of the EPG screen presented by a semi-transparent display technique according to the second embodiment.

Next, the size of the EPG slot DS is sought (step S38). This seek operation can be carried out to present the EPG screen on either the right on the left screen, for example, in the TV receiver with the double-window display system. FIG. 8 shows an example of that the EPG screen is superimposed on the normal program display screen by using a semi-transparent display.

When a viewer selects the non-linear logarithmic change characteristics, i.e., the curve A of FIG. 6b, for the EPG slot after the time difference Td and the EPG slot size DS have been determined, the size Px of a given EPG slot is determined by the following equations (step S39). Here the beam m of the logarithmic function Log is set to 10, while its coefficient N is also set to 10.

$$Ps=DS/Max(\text{Pixel Number})\times(1/\text{Log}_{10}(N\times Td)) \quad (7)$$

Herein "Pixel Number" represents the number of effective display pixels in a line.

For instance, in the case that the EPG screen is displayed on a whole screen, the slot position for a program starting after one hour is determined as follows.

$$Px=1\times(1/\text{Log}_{10}33\ 1)=1$$

Further the slot position for a program starting after three hours is determined as follows.

$$Px=1\times(1/\text{Log}_{10}10\times3)=0.68$$

Next, the actual size of the program display in the time-axis direction is calculated by using the basic size Psz (step S40). For instance, for the case of 200 Pixel, the size Pu of the EPG slot in the time-axis direction for a program starting after two hours is given by the following equation 8.

$$Pu=Px=Psz=0.77\times200=154 \quad (8)$$

Next, based on the size of the EPG slot determined by the equation 8, it is checked how many characters are required to be placed in the slot. Then the size of the characters are changed in accordance with the result of the check and then the characters with the size as changed are displayed in the EPG slot. Referring back to FIG. 7, the flow of the above-described operation will be described.

First, a character string such as a program title in the EPG data is read out (step S41). A number of characters Pc in the program title is then counted (step S42). Further, a number of characters Pg in additional information such as a sub-title is counted (step S43). Then, the total number of the characters to be displayed is calculated (step S44). then the sizes of the characters are determined from the total number of characters and the size of the EPG slot determined by the equation 8.

In this determination, first the number of character is selected from the large ranking the number of characters Pc in the program title and the number of characters Pg in the sub title. The size of the EPG slot Pu is divided by the selected one of the number of characters by the following equation 9 (step S45).

$$Fsz=Pu/Max(Pc|Pc+Pg) \quad (9)$$

The result Fsz of the equation 9 is compared with a threshold value Fmin of the minimum character size stored in the main memory 25 (step S46). When the Fsz is greater than the Fmin, characters with the font-size nearest to the Fsz are used for the EPG (step S47). If the Fsz is smaller than the Fmin, first the number of characters Pc in the program title and the number of characters Pg in the sub-title are compared with each other. If the Pc is smaller than the Pg, the value Fsz is again calculated by the following equation 10 (steps S48, and S49).

$$Fsz = Pu/Pc \quad (10)$$

Here, the reason that the number of characters Pc in the program title is used for the determination of the Fsz is because the program title is more important for viewers than the additional program information such as the sub-title. Here, again the value Fsz and the Fmin are compared with each other (step S46). If the value Fsz is greater than the Fmin, characters with the font-size nearest to the Fsz are used for the EPG slot (step S47).

If the value Fsz is smaller than the Fmin in the step S46, the display of character string in the EPG slots is given up and the slots are left in a blank (step S50).

Then, it is determined whether the character display processing has been carried out for EPG slots. If there remain any EPG slot unfinished the character presentation, the operation repeats the routine on and after the step S37 (step S51).

As is evident from the flow of steps as described above, the present embodiment can suppress the reduction of the characters to be displayed in the EPG slots when the size of the slots had been reduced, since although the EPG slots are compressed in only the time-axis direction by the non-linear processing, the size that the characters are reduced is tied to the size of the EPG slots. Accordingly, it can provide viewers a large amount of program information.

Now a third embodiment of the present invention will be explained hereinafter. Here, a process for shifting the start position on the EPG screen according to the non-linear processing will be explained.

Figure 9A:
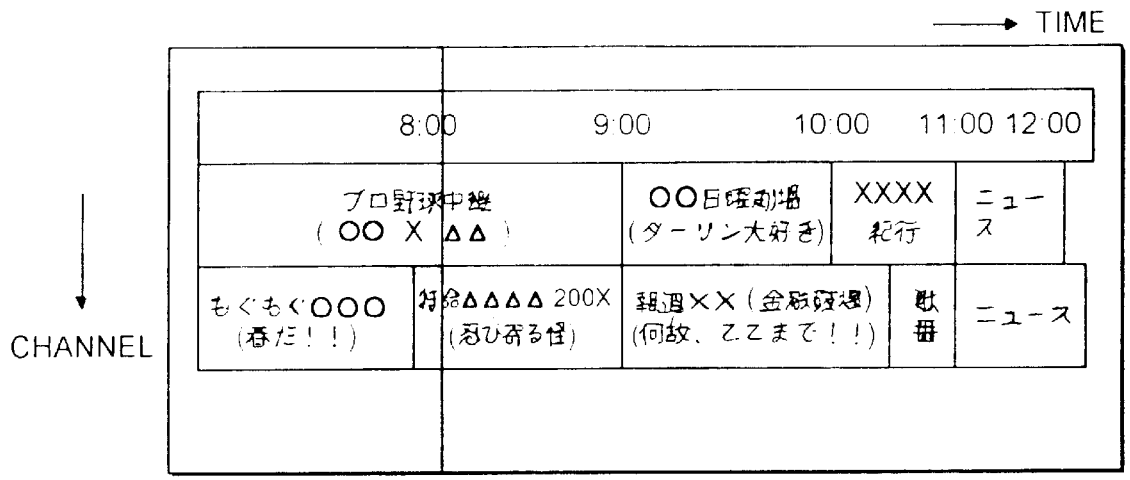
FIG. 9a is a diagram showing the EPG screen according to a third embodiment.
Figure 9B:
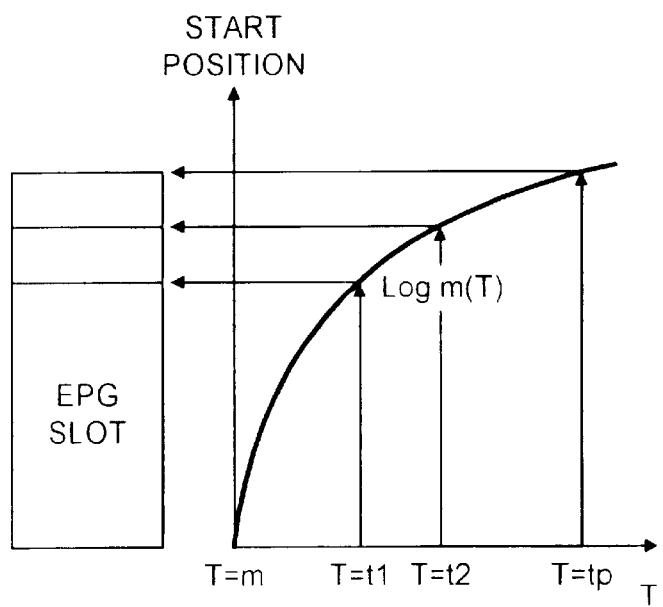
Figure 10:
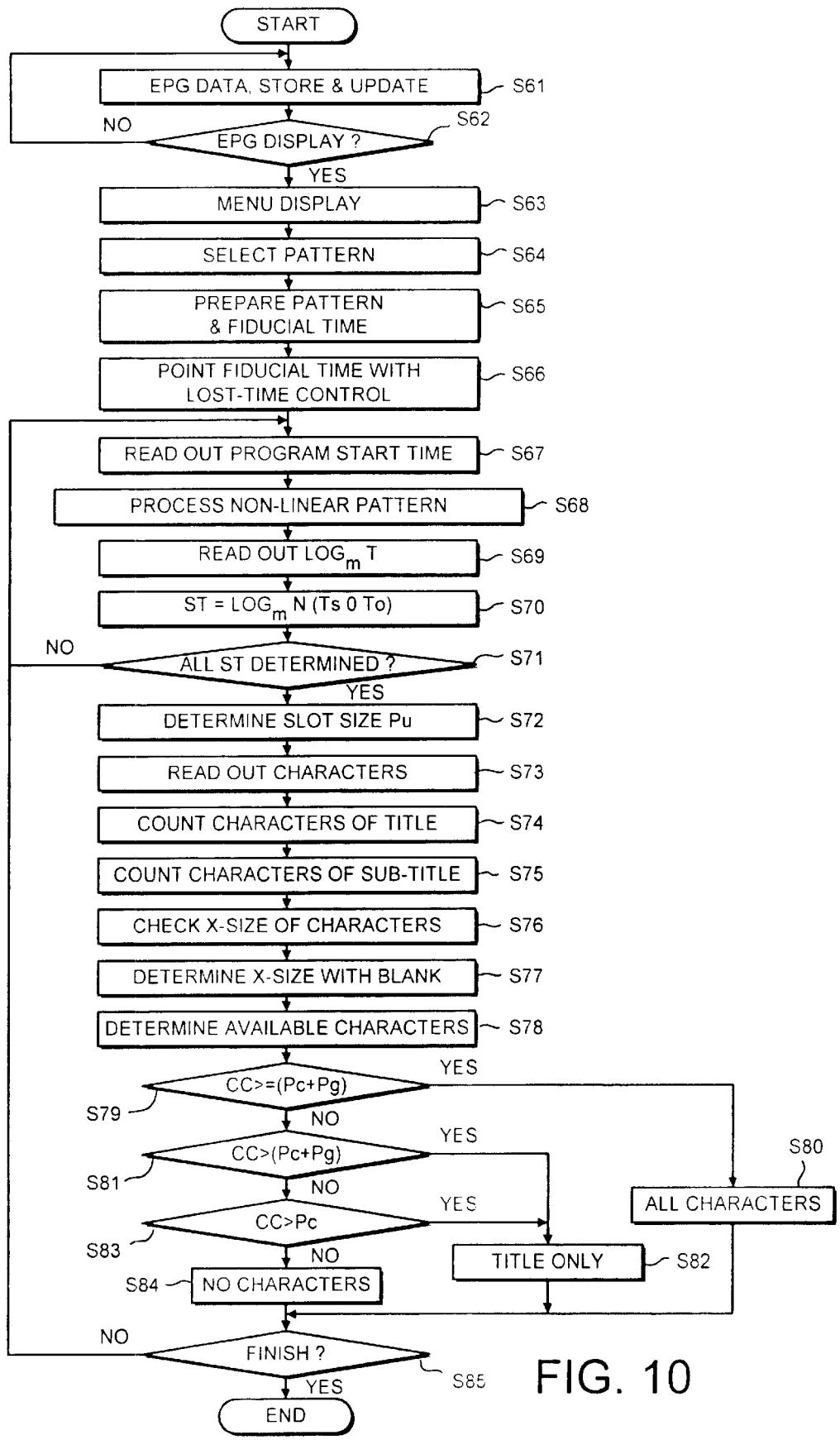
FIG. 10 is a flowchart showing the steps of the EPG screen processing according to the third embodiment.
Figure 11:
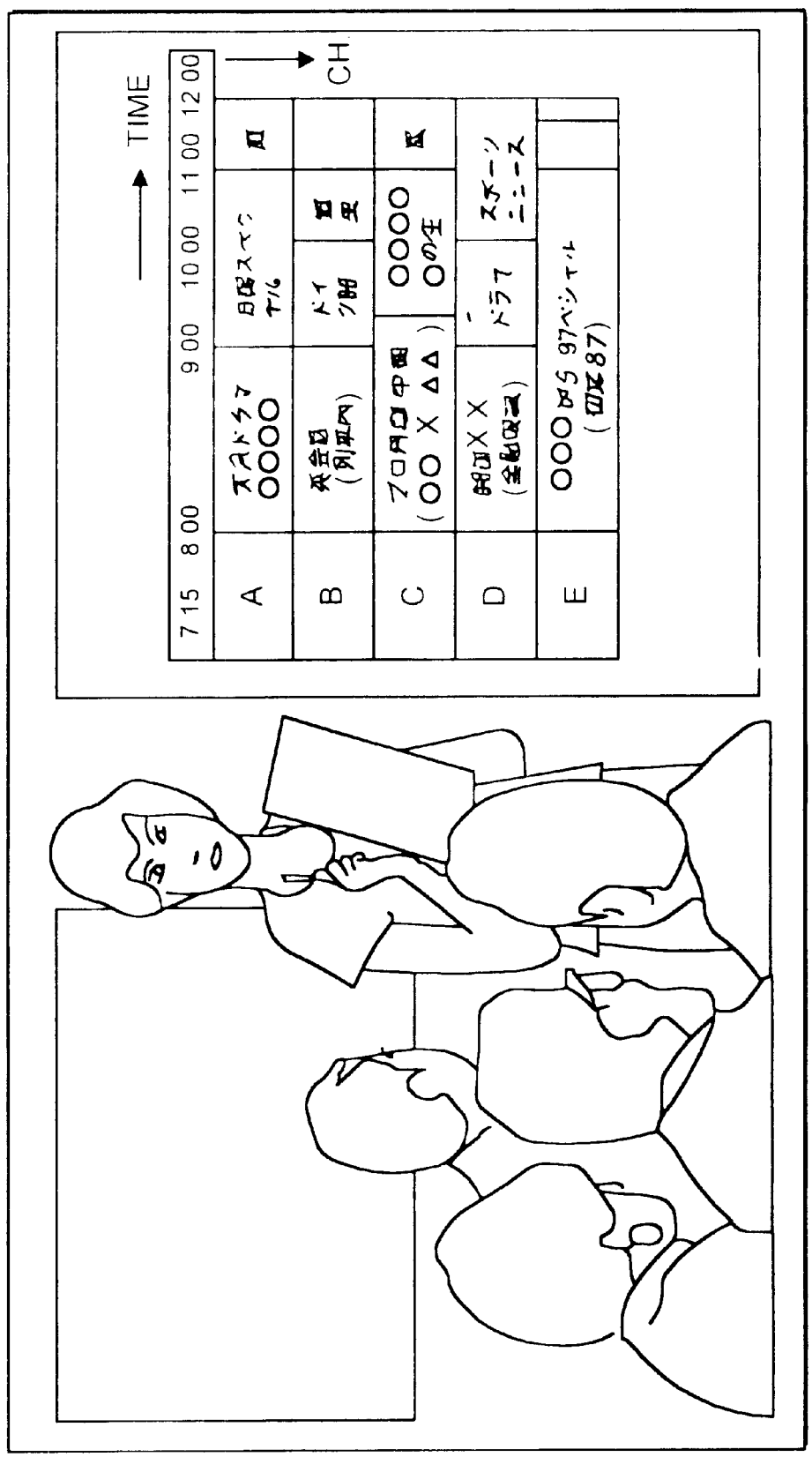
FIG. 11 is a diagram showing another example of the EPG screen applied to a double-window display according to the third embodiment.

FIGS. 9a and 9b show an example that the start position of the EPG slots on the EPG screen is compressed in a non-linear manner in the time-axis direction, and that the number of characters available in the EPG slot is variable. Wherein FIG. 9a shows the EPG screen according to this third embodiment and FIG. 9b shows the relation between the non-linear logarithmic curve and the size of the EPG slots. FIG. 10 shows the flow of operation steps for displaying the non-linear patterned EPG screen according to the third embodiment. FIG. 11 shows an example of such a double-window display to which the operation FIG. 10 is adapted.

In FIG. 10, the EPG data from the TV station and the present time data are updated and stored in the step S61. When the viewer selects the EPG screen (step S62), a menu screen listing display patterns is presented (step S63). The viewer then selects his/her favorite display pattern (step S64). A non-linear processing routine corresponding to the selected display pattern is prepared, and a time defining a fiducial (or the present time, at the beginning) T0 is read out from the main memory 25 (step S65). As shown in FIG. 9a, the fiducial time is indicated by a hair-line cursor (step S66). Here the initial value of the fiducial time is set to the present time.

A start time Ts of each program is extracted from the EPG data (step S67). The start time Ts is then used in the non-linear processing routine (step S68). In the non-linear processing routine, a logarithmic function $Log_m$ it is read out from a memory (the base m of the logarithmic function Log is set to any number, while its coefficient N is also set to any number) (step 69). Then a start position St of each of the EPG slot is determined by the following equation 11 (step S70). The operation of the steps S67 through S70 is repeated until the start positions St of all EPG slots have been determined (step S71).

$$St = Lot_m N(Ts-T0) \quad (11)$$

The relation of the start position St determined by the equation 11 and the time has a logarithmic function Log, as shown in FIG. 9b.

Next, based on the start position of the EPG slot determined by the equation 11, the size of the EPG slot is determined and also it is checked how many characters can be picked in the slot. Then, based on the result, necessary characters are displayed in the EPG slot. Referring back to FIG. 10, the flow of the above-described operation will be described.

First, the size of the EPG slot Pu is determined from the difference between the start position St0 of the EPG slot and the start position St1 of the following EPG slot (step S72).

$$Pu = St1 - St0 \quad (12)$$

Further, a character string such as a program title is extracted from the EPG data (step S73). A number of characters Pc in the program title is then counted (step S74). Further, a number of characters Pg in additional information such as a sub-title is counted (step S75). First, for the number of characters obtained in the step S73, the number of displayable characters is checked from the size determined by the equation 12. First in this operation, in the case that the character size is fixed, the pixel size Cs of the character in the X direction (i.e., the time-axis direction on the EPG screen) is checked (step S76). When a gap (blank) Gp is required between characters, the size Cp of each character including the gap Gp in the X direction will be determined by the following equation 13 (step S77).

$$Cp = Cs + Gp \quad (13)$$

Then the number of displayable characters CC is determined by dividing the slot size Pu determined by the equation 12 by the character size Cp determined by the equation 13, as shown by the following equation 14 (step S78).

$$CC = Pu/Cp \quad (14)$$

Then a character string available in the EPG slot is decided (steps S79, S81, and S82) by comparing the number of characters Pc (or Pc+Pg) obtained in the step S77 with the number of displayable characters CC calculated by the equation 14 (steps S80, S82, and S84).

If "CC>=(Pc+Pg)" is positive (step S79), then a whole character string display will be carried out (step S80).

If "CC<(Pc+Pg) && CC>=PC" is positive (step S81), only a program title display will be carried out (step S82).

If "CC<PC" is positive (step S83), no character display will be carried out (step S84).

Then, it is determined whether the character display processing has been carried out for EPG slots. If there remains any EPG slot unfinished the character presentation, the operation repeats the routine on and after the step S67 (step S85).

As it is obvious from the processing flow described above, according to the present embodiment, since the start position of the EPG slot is compressed in the time-axis direction by the non-linear processing, and the number of characters available in the EPG slot is made variable, it can provide viewers an EPG screen with the easily readable pattern.

Next, the fourth embodiment according to the present invention will be explained hereinafter. Here, the case that the start point of the EPG slot is changed by the non-linear processing and the size of the characters can be varied in accordance with the size of the EPG slot will be explained.

Figure 12A:
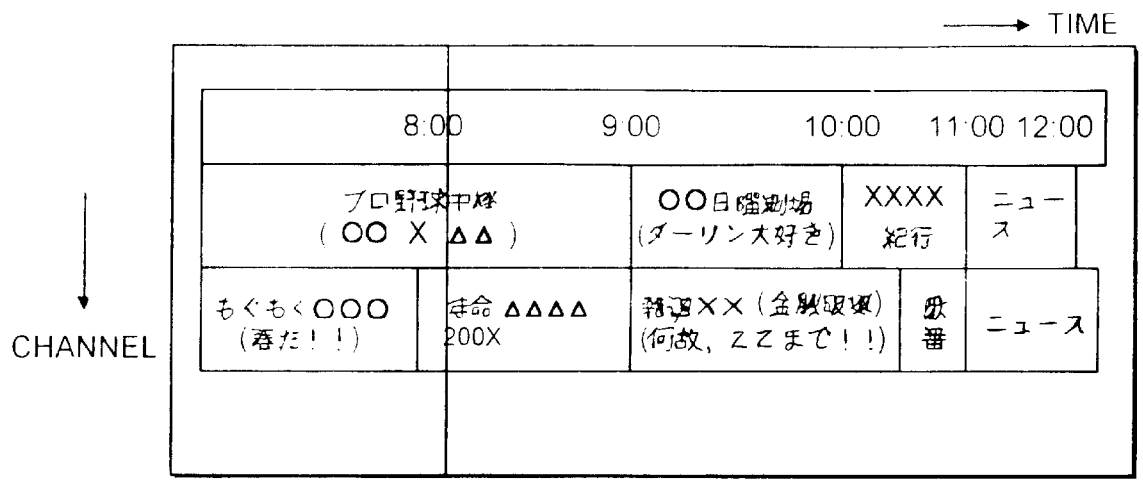
FIG. 12a is a diagram showing the EPG screen according to a fourth embodiment.
Figure 12B:
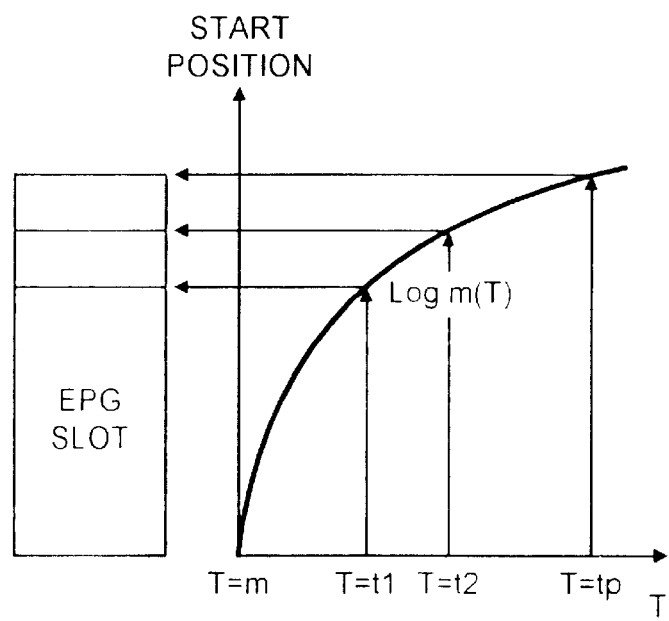
Figure 13:
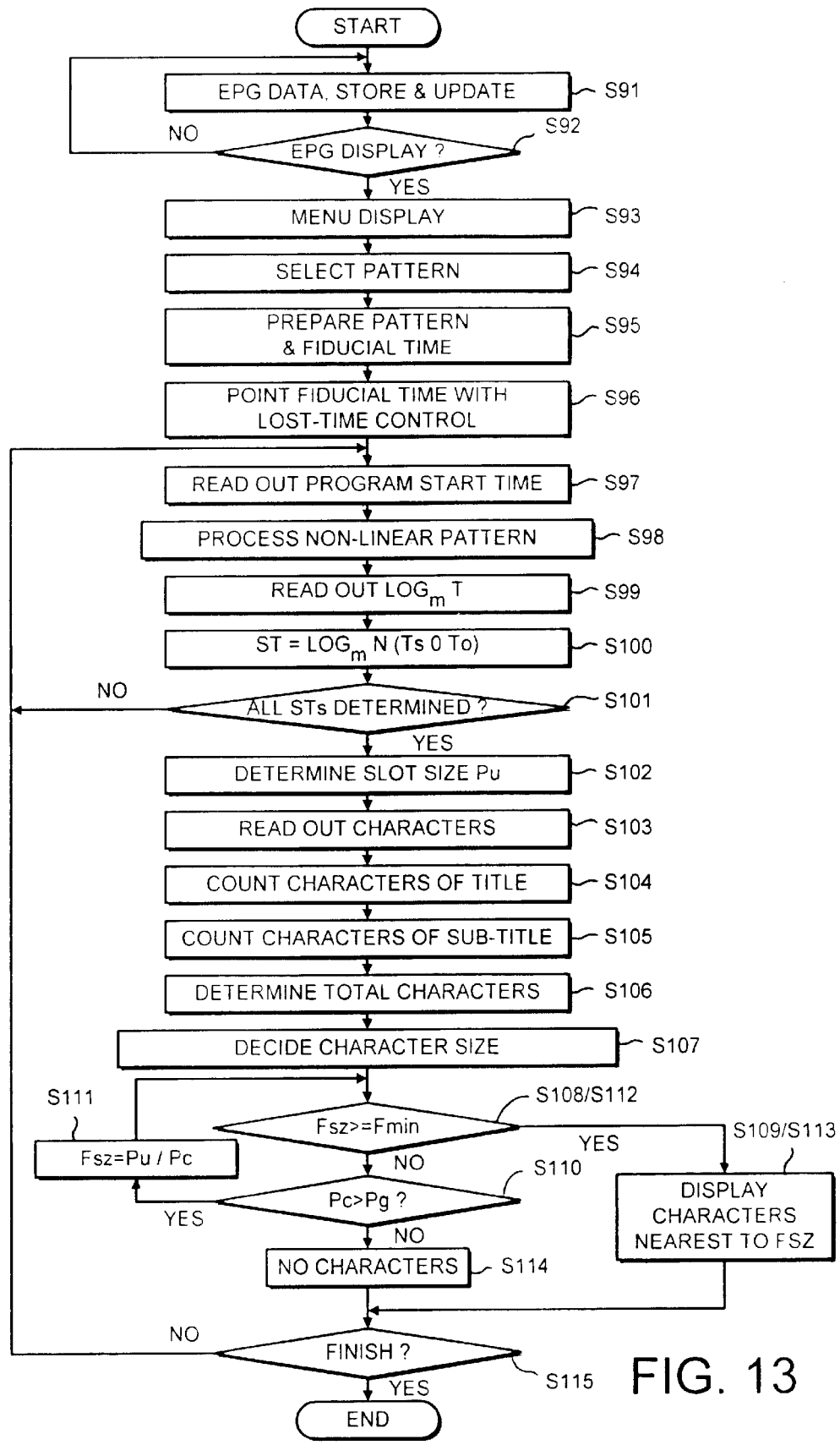
FIG. 13 is a flowchart showing the steps of the EPG screen processing according to the fourth embodiment.
Figure 14:
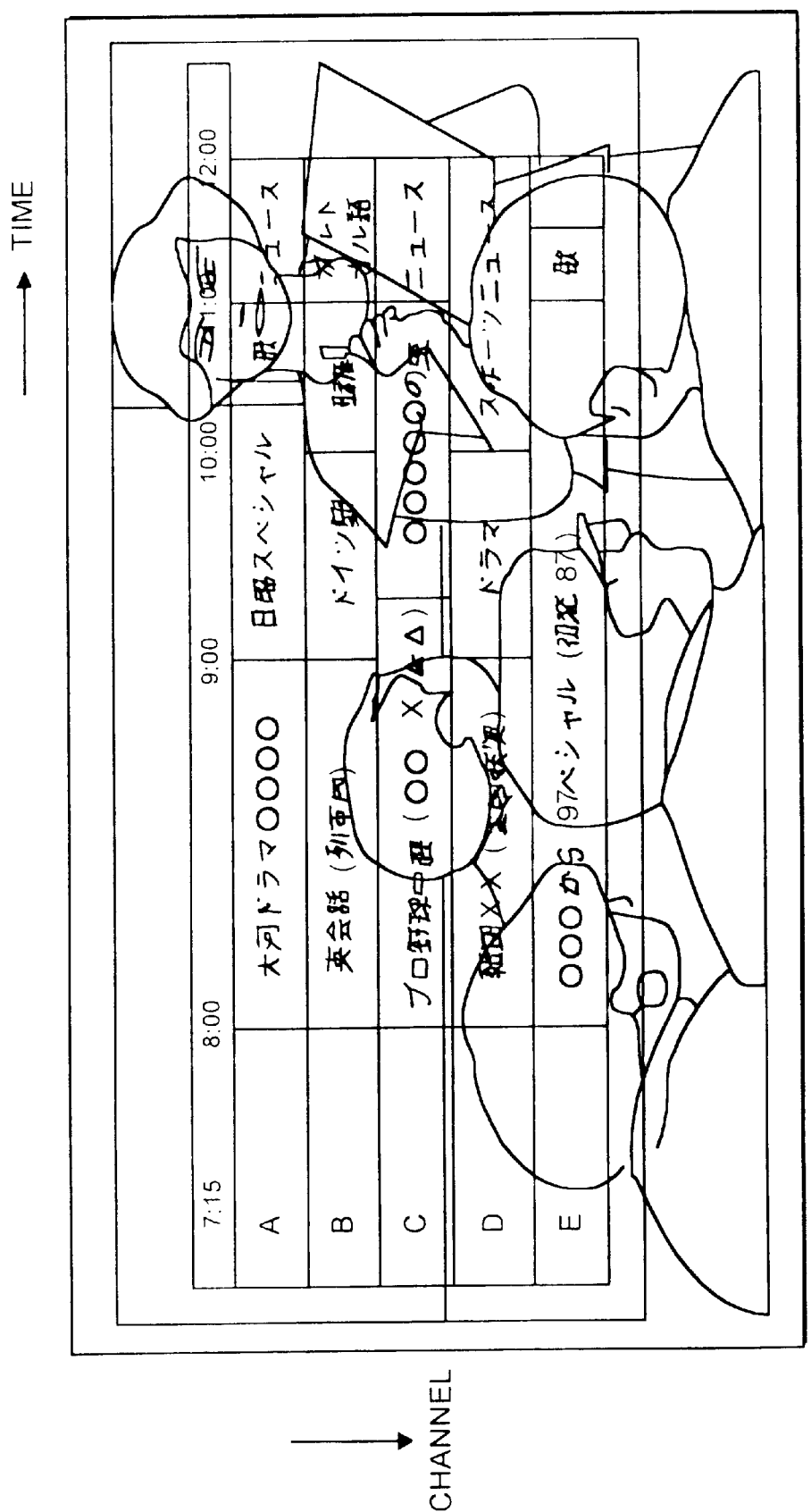
FIG. 14 is a diagram showing another example of the EPG screen presented by a semi-transparent display technique according to the fourth embodiment.

FIGS. 12a and 12b show an example that the start position of the EPG slots on the EPG screen is compressed in a non-linear manner in the time-axis direction, and that the size of characters is variable. Wherein FIG. 12a shows the EPG screen according to this fourth embodiment and FIG. 12b shows the relation between the non-linear logarithmic curve and the size of the EPG slots. FIG. 13 shows the flow of operation steps for displaying the non-linear patterned EPG screen according to the fourth embodiment. FIG. 14 shows an example in which the EPG screen is superimposed on the normal program display screen on a wide-aspect display by using a semi-transparent display.

In FIG. 13, the EPG data from the TV station and the present time data are updated and stored in the step S91. When the viewer selects the EPG screen (step S92), a menu screen listing display patterns is presented (step S93). The viewer then selects his/her favorite display pattern (step S94). A non-linear processing routine corresponding to the selected display pattern is prepared, and a time defining a fiducial (or the present time, at the beginning) T0 is read out from the main memory 25 (step S95). As shown in FIG. 12a, the fiducial time is indicated by a hair-line cursor (step S96). Here the initial value of the fiducial time is set to the present time.

A start time Ts of each program is extracted from the EPG data (step S97). The start time Ts is then used in the non-linear processing routine (step S98). In the non-linear processing routine, a logarithmic function $\text{Log}_m T$ is read out from a memory (the base m of the logarithmic function Log is set to any number, while its coefficient N is also set to any number) (step S99). A start position St of each of the EPG slot is determined by the following equation 15 (step S100). The operation of the steps S97 through S100 is repeated until the start positions St of all EPG slots have been determined (step S101).

$$St = \text{Log}_m N(Ts - T0) \tag{15}$$

The relation of the start position St determined by the equation 15 and the time has a logarithmic function Log, as shown in FIG. 12b.

Next, based on the start position of the EPG slot determined by the equation 15, the total number of the characters to be displayed and the size of characters to be included in the EPG slot are determined. Then based on the result, available characters are displayed in the EPG slot. Referring back to FIG. 13, the flow of the above-described operation will be described.

First, the size of the EPG slot Pu is determined from the difference between the start position St0 of the EPG slot and the start position St1 of the following EPG slot (step S102).

$$Pu = St1 - St0 \tag{16}$$

Then, a character string such as a program title is extracted from the EPG data (step S103). A number of characters Pc in the program title is then counted (step S104). Further, a number of characters Pg in additional information such as a sub-title is counted (step S105). Then, the total number of the characters to be displayed is calculated (step S106). Then the sizes of the characters are determined from the total number of the characters and the size of the EPG slot determined by the equation 16.

In this determination, first the number of characters is selected from the larger ranking the number of characters Pc in the program title and the number of characters Pg in the sub-title. The size of the EPG slot Pu is divided by the selected one of the number of characters by the following equation 17 (step S107).

$$Fsz = Pu / \text{Max}(Pc | Pc + Pg) \tag{17}$$

The result Fsz of the equation 17 is compared with a threshold value Fmin of the minimum character size stored in the main memory 25 (step S108). When the Fsz is greater then the Fmin, characters with the font-size nearest to the Fsz are used for the EPG (step S109). If the Fsz is smaller than the Fmin, first the number of characters Pc in the program title and the number of characters Pg in the sub-title are compared with each other. If the Pc is smaller than the Pg, the value Fsz is again calculated by the following equation 18 (steps S110, S111).

$$Fsz = Pu / Pc \tag{18}$$

Here, the reason that the number of characters Pc in the program title is used for the determination of the Fsz is because of that the program title is more important for viewers than the additional program information such as the sub-title. Here, again the value Fsz and the Fmin are compared with each other (step S112). If the value Fsz is greater than the Fmin, characters with the font-size nearest to the Fsz are used for the EPG slot (step S113).

If the value Fsz is yet smaller than the Fmin in the step S112, the display of character string in the EPG slots is given up and the slots are left in a blank (step S114).

Then, it is determined whether the character display processing has been carried out for EPG slots. If there remains any EPG slot unfinished the character presentation, the operation repeats the routine on and after the step S97 (step S115).

As is evident from the flow of steps as described above, the present embodiment can provide a lot of program information when the size of the slots had been reduced, since although the start positions of the EPG slots are compressed in only the time-axis direction by the non-linear processing the size of the characters is made variable for inserting an entire character string into the EPG slots.

Now a fifth embodiment of the present invention for processing the line of the EPG slots in the direction of the channel-list axis will be explained hereinafter. Here the fifth embodiment has a configuration similar to the first embodiment, but different by that the size of the characters are variable.

Figure 15A:
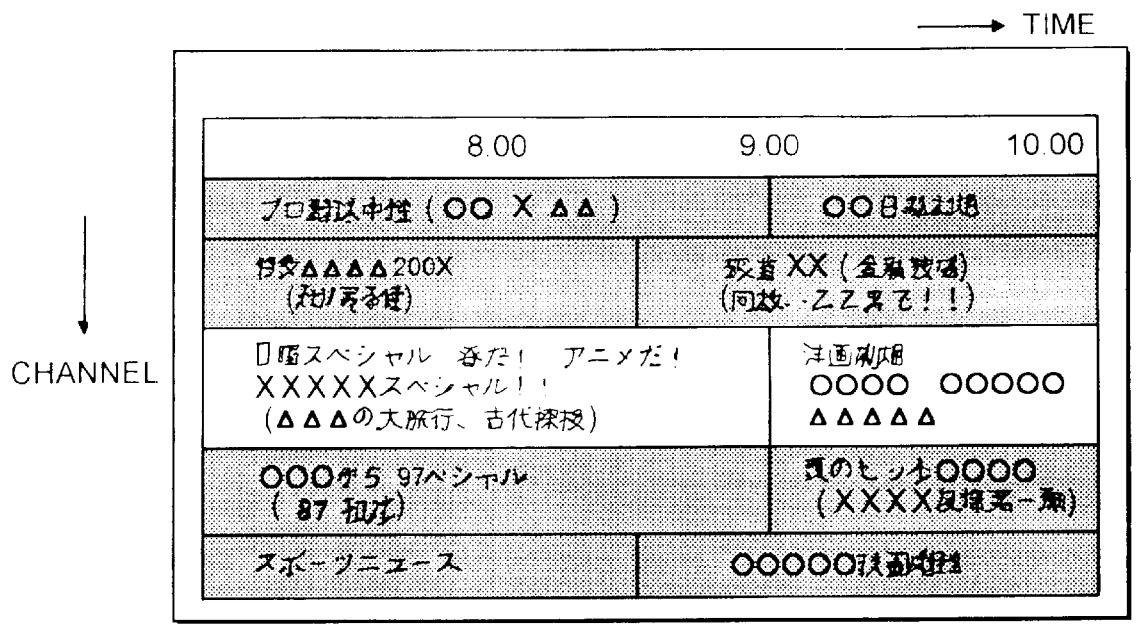
FIG. 15a is a diagram showing the EPG screen according to a fifth embodiment.
Figure 15B:
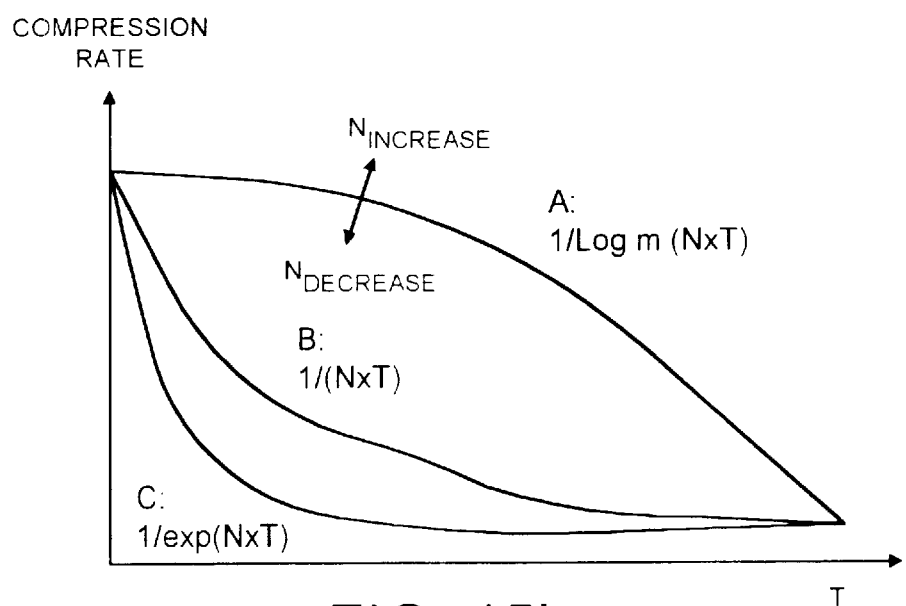
Figure 16:
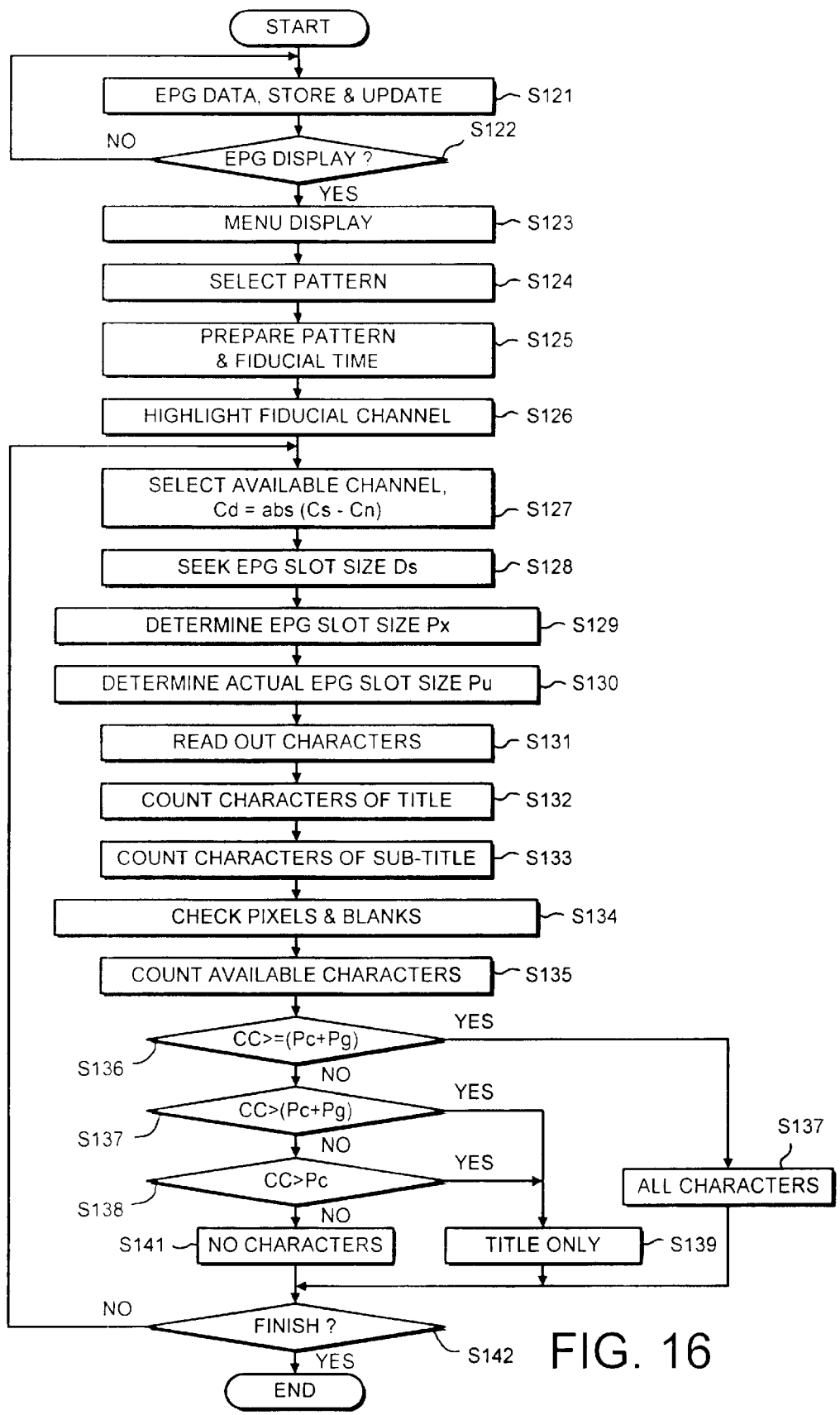
FIG. 16 is a flowchart showing the steps of the EPG screen processing according to the fifth embodiment.
Figure 17:
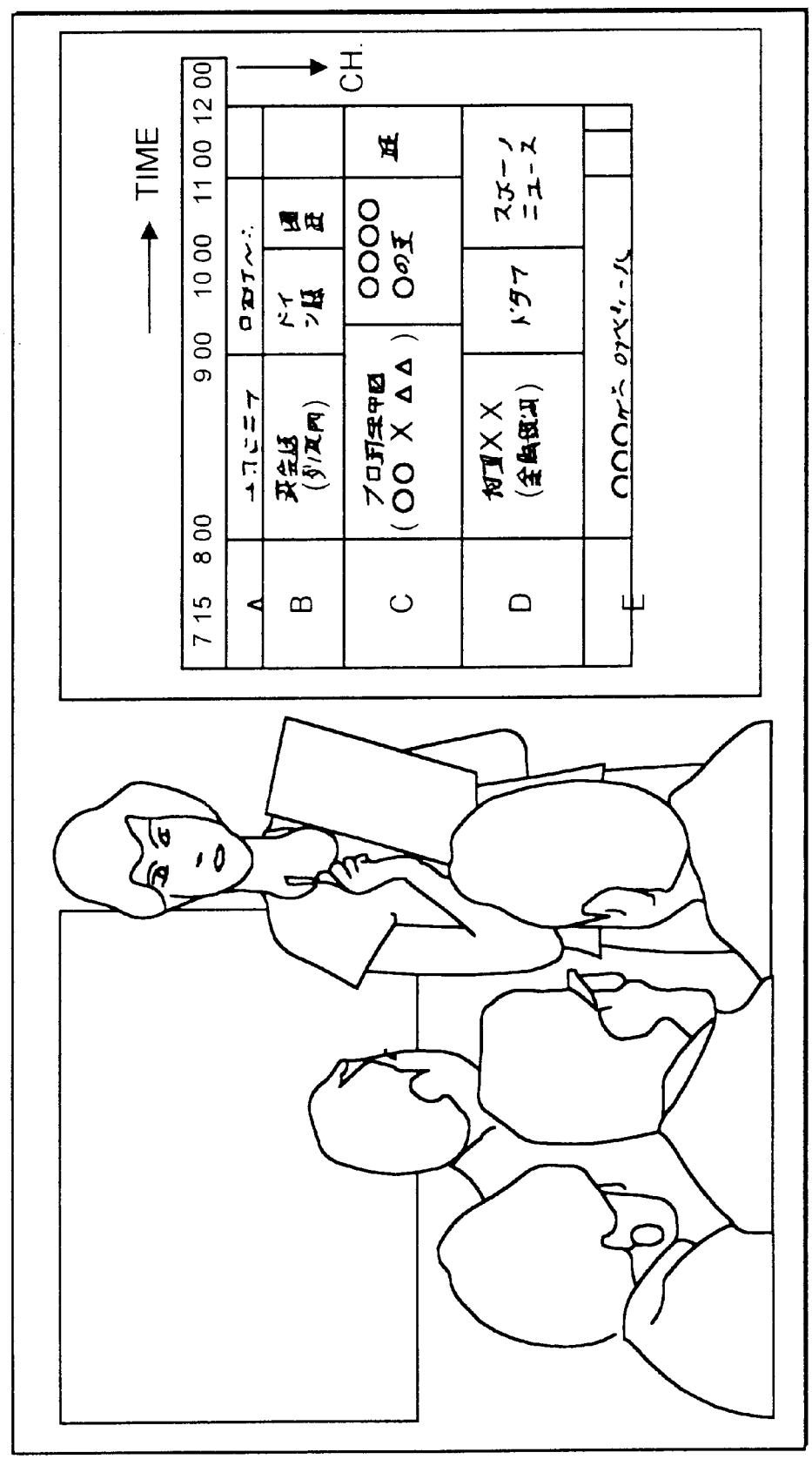
FIG. 17 is a diagram showing another example of the EPG screen applied to a double-window display according to the fifth embodiment.

FIGS. 15a and 15b show an example in which the size of the EPG slots is compressed in a non-linear manner in the channel-lists axis direction, and that the number of characters varies in accordance with the vertical size of the EPG slot. Wherein FIG. 15a shows the EPG screen according to this fifth embodiment and FIG. 15b shows three patterns of non-linear change characteristics. FIG. 16 shows the steps of the non-linear processing. FIG. 16 shows the flows of operation steps for displaying the non-linear patterned EPG screen according to the fifth embodiment. FIG. 17 shows the case applying the same processing shown in FIG. 16 to the double-window display. FIG. 17 shows an example of such a double-window display to which the operation of FIG. 16 is adapted.

In FIG. 16, the EPG data from the TV station and the present time data are updated and stored in the step S121.

When the viewer selects the EPG screen (step S122), a menu screen listing display patterns is presented (step S123). The viewer then selects his/her favorite display pattern (step S124). A non-linear processing routine corresponding to the selected display pattern is prepared. Further at a beginning of the operation, a channel slot corresponding to the channel that is currently received by the viewer is defined (step S125). Then the channel slot of the channel number or the TV station name is highlighted as shown in FIG. 15a or 17 (step S126).

On the other hand, a channel number data of an available channel is extracted from the EPG data (step S127). In relation to the channel number Cn, an absolute value of the difference Cd from the channel number Cn to the channel number Cp of currently received program by the following equation 19.

$$Cd=abs(Cp-Cn) \tag{19}$$

Next, the size of the EPG slot DS is sought (step S128). This seek operation can be carried out to present the EPG screen on either the right or the left screen not but on a whole screen as shown in FIG. 15a, for example in a TV receiver with a high-performance function like the double-window system. FIG. 17 shows an example of the EPG screen presented on such a double-window display.

When a viewer selects the non-linear logarithmic change characteristics for the EPG slot after the absolute channel number difference Cd and the size of the EPG slot DS have been determined, the size of a given EPG slot is determined by the following equations (step S129). Here the base m of the logarithmic function Log is set to 10, while its coefficient N is also set to 10.

$$Ps=DS/\text{Max (Pixel Number)} \times (1/\text{Log}_{10}(N \times Cd)) \tag{20}$$

Herein "Pixel Number" represents the number of effective display pixels in a line. For instance, in the case that the EPG screen is displayed on a whole screen, the position of the next EPG slot is determined as follows.

$$Px=1\times(1/\text{Log}_{10} 10\times 1)=1$$

Further the position of the next EPG slot but one to the EPG slot is determined as follows.

$$Px=1\times(1/\text{Log}_{10} 10\times 2)=0.77$$

Next, the actual size of the EPG slot in the time-axis direction is determined based on the basic size Psz (step S130). For instance, for the case of 200 Pixel, the size Pu of the next EPG slot but one to the EPG slot in the time-axis direction is given by the following equation 21.

$$Pu=Px\times Psz=0.77\times 200=154 \tag{21}$$

Next, based on the size of the EPG slot determined by the equation 21, it is checked how many characters can be placed in the slot. Then based on the result available characters are displayed in the EPG slot. The processing will be explained hereinafter. Referring back to FIG. 16, the flow of the above-described operation will be described.

Further, a character string such as a program title is extracted from the EPG data (step S131). A number of characters Pc in the program title is then counted (step S132). Further, a number of characters Pg in additional information such as a sub-title is counted (step S133). For the number of characters Pc obtained in the step S132, the number of displayable characters is checked from the size Pu determined by the equation 3.

First in this operation, in the case that the character size is fixed, the pixel size Cs of the character in the X direction (i.e., the time-axis direction on the EPG screen) is checked (step S134). When a gap (blank) Gp is required between characters, the size Cp of each character including the gap Gp in the X direction will be determined by the following equation 4 (step S134).

$$Cp=Cs+Gp \tag{22}$$

Then the number of displayable characters CC is determined by dividing the slot size Pu determined by the equation 21 by the character size Cp determined by the equation 22, as shown by the following equation 23 (step S135)

$$CC=Pu/Cp \tag{23}$$

Then a character string available in the EPG slot is decided (steps S137, S139, and S141) by comparing the number of characters Pc (or Pc+Pg) obtained in the step S132 with the number of displayable characters CC calculated by the equation 23 (steps S136, S137, and S138).

If "CC>=(Pc+Pg)" is positive (step S136), then a whole character string display will be carried out (step S139).

If "CC<(Pc+Pg) && CC>=PC" is positive (step S138), only a program title display will be carried out (step S139).

If "CC<PC" is positive (step S140), no character display will be carried out (step S141).

Then, it is determined whether the character display processing has been carried out for EPG slots. If there remains any EPG slot unfinished the character presentation, the operation repeats the routine on and after the step S127 (step S142).

As is evident from the flow of steps as described above, the present embodiment can provide a lot of program information due to the size of the EPG slots varies in the channel-list axis direction.

Now a sixth embodiment of the present invention will be explained hereinafter. This sixth embodiment is different from the fifth embodiment by that the size of the characters are variable.

Figure 18A:
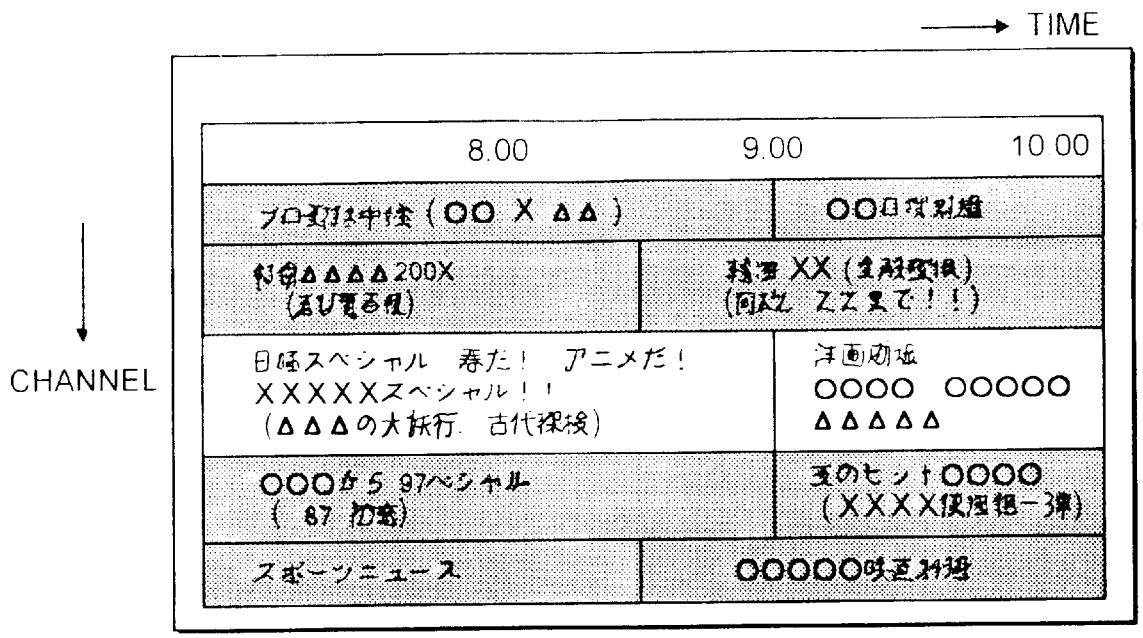
FIG. 18 is a diagram showing the EPG screen of a sixth embodiment and the 1/f-fluctuation characteristic.
Figure 18B:
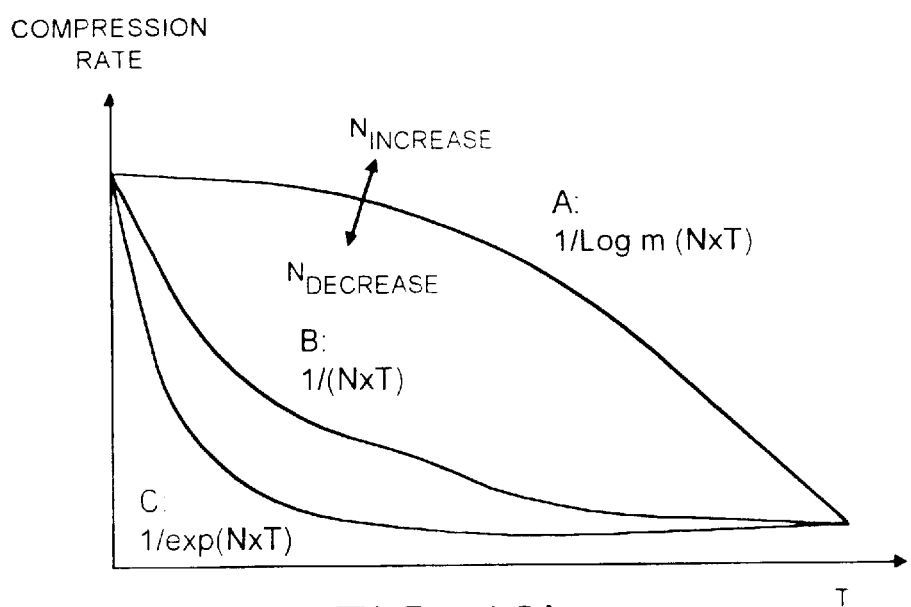
Figure 19:
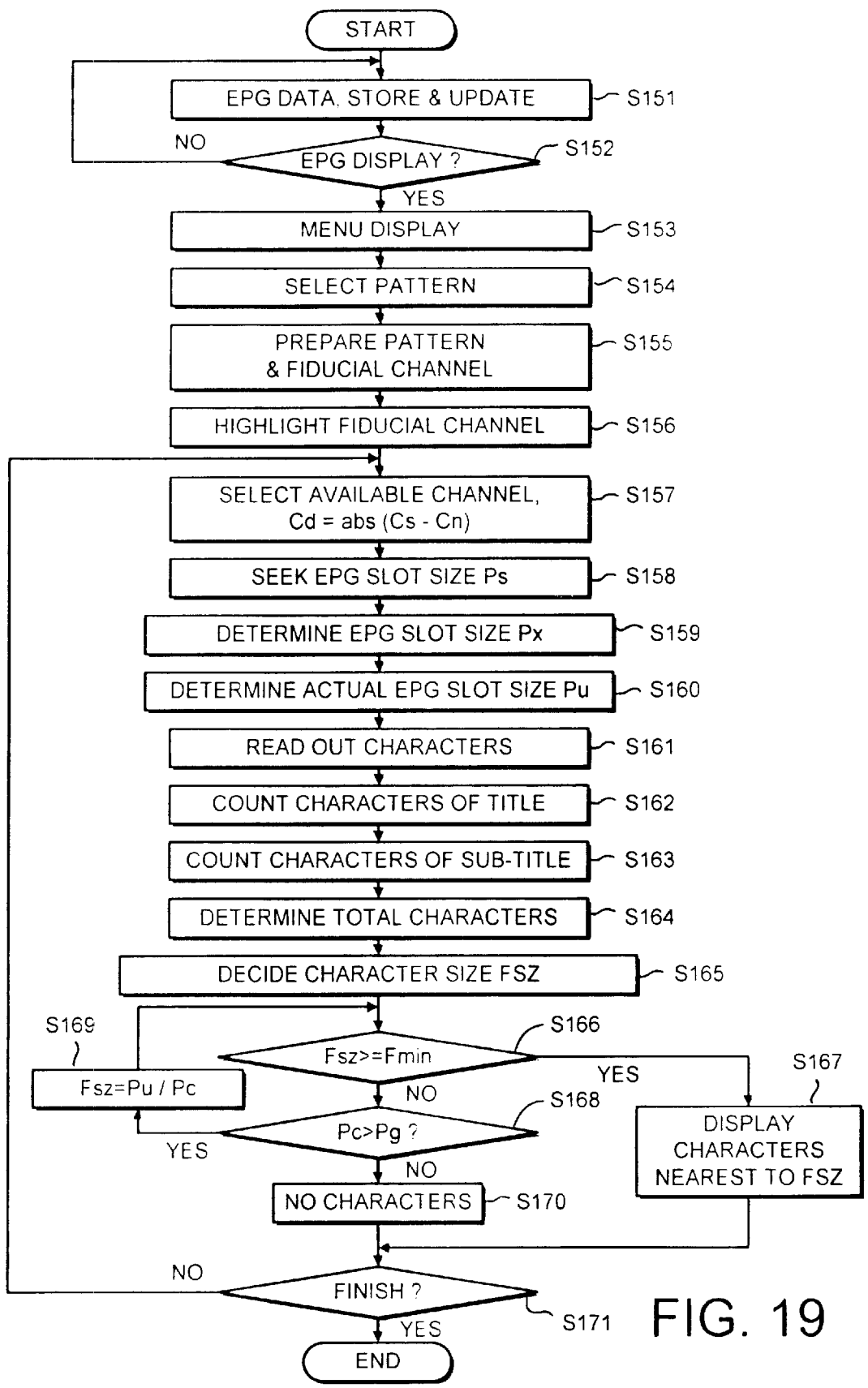
FIG. 19 is a flowchart showing the steps of the EPG screen processing of the sixth embodiment.
Figure 20:
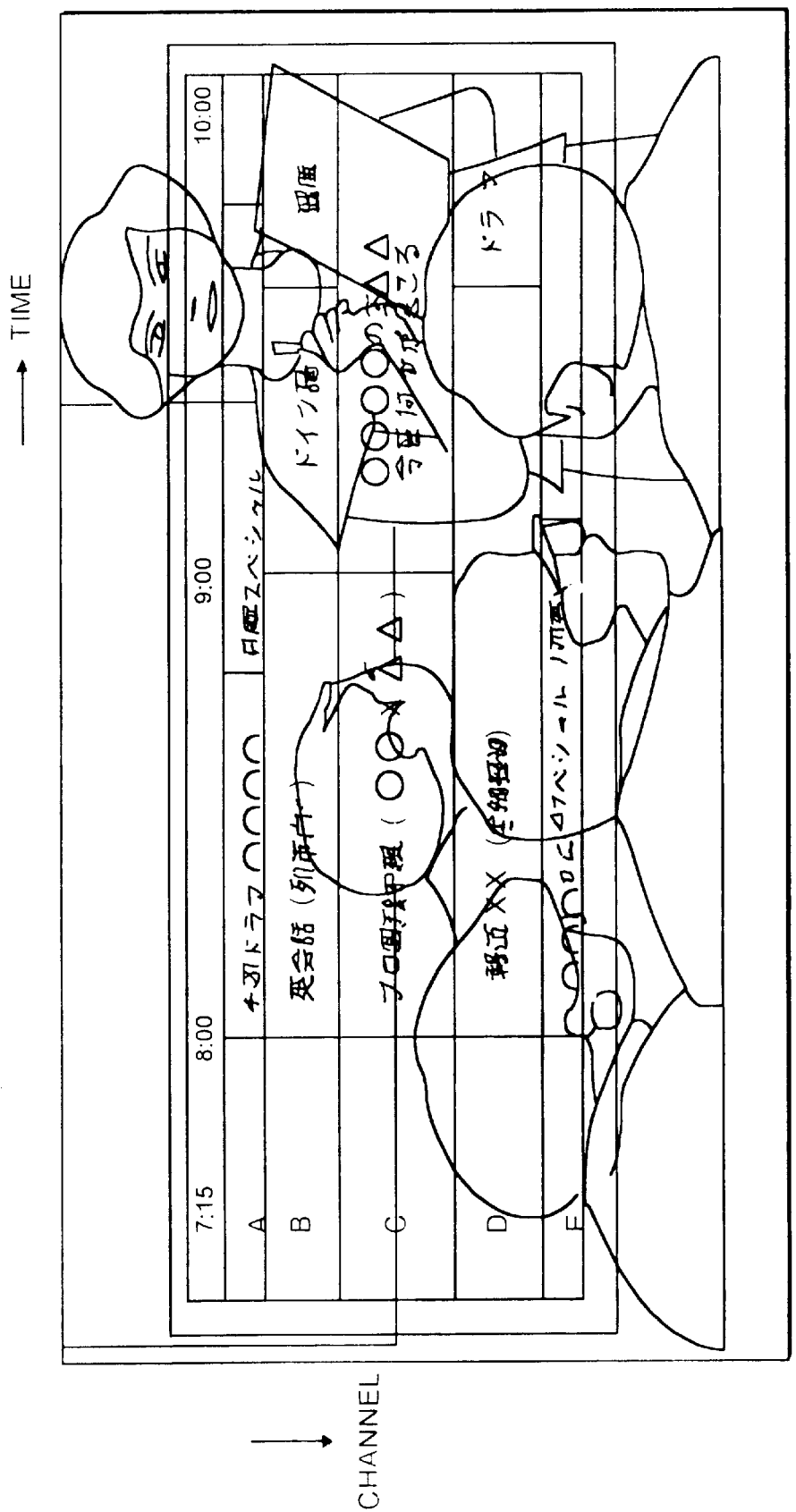
FIG. 20 is a diagram showing another example of the EPG screen presented by a semi-transparent display technique according to the sixth embodiment.

FIGS. 18a and 18b show an example that the size of the EPG slots is compressed in a non-linear manner in the time-axis direction, and that the character size varies in accordance with the size of the EPG slot. Wherein FIG. 18a shows the EPG screen according to this sixth embodiment and FIG. 18b shows three patterns of non-linear change characteristics. FIG. 19 shows the flow of operation steps for displaying the non-linear patterned EPG screen according to the sixth embodiment. FIG. 20 shows an example in which the EPG screen is superimposed on the normal program display screen on a wide-aspect display by using a semi-transparent display.

In FIG. 19, the EPG data from the TV station and the present time data are updated and stored in the step S151. When the viewer selects the EPG screen (step S152), a menu screen listing display patterns is presented (step S153). The viewer then selects his/her favorite display pattern (step S154). To the selected display pattern, it reads out the non-linear processing routine. Further at a beginning of the operation, a channel slot corresponding to the channel that is currently received by the viewer is defined (step S155). Then the channel slot of the channel number or the TV station name is highlighted as shown in FIG. 18a (step S156).

On the other hand, a channel number dat of an available channel is extracted from the EPG data (step S157). In relation to the channel number Cn, an absolute value of the difference Cd from the channel number Cn to the channel number Cp of currently received program by the following equation 24.

$$Cd=abs(Cp-Cn) \qquad (24)$$

Next the size of the EPG slot DS is sought (step S158). This seek operation can be carried out to present the EPG screen on either the right or the left screen, for example in a TV receiver with a high-performance function like the double-window system. FIG. 20 shows an example in which the EPG screen is superimposed on the normal program display screen by using a semi-transparent display.

When a viewer selects the non-linear logarithmic change characteristics for the EPG screen after the time difference Td and the EPG slot size DS have been determined, the size Px of a given EPG slot is determined by the following equations (step S159). Here the base m of the logarithmic function Log is set to 10, while its coefficient N is also set to 10.

$$Ps=DS/\text{Max(Pixel Number)} \times (1/\text{Log}_{10}(N \times Cd)) \qquad (25)$$

Herein "Pixel Number" represents the number of effective display pixels in a line. For instance, in the case that the EPG screen is presented on a whole screen, the position of the next channel slot will be given as follows.

$$Px=1 \times (1/\text{Log}_{10} 10)=1$$

Further that of a next EPG slot but three to the EPG slot will be given as follows.

$$Px=1 \times (1/\text{Log}_{10} 30)=0.68$$

Further the position of the next channel slot but two to the channel slot is determined as follows.

$$Px=1 \times (1/\text{Log}_{10} 20)=0.77$$

Next, the actual size of the EPG slot in the time-axis direction is determined based on the basic size Psz (step S160). For instance, for the case of 200 Pixel, the size Pu of the next EPG slot but one to the EPG slot in the time-axis direction is given by the following equation 21.

$$Pu=Px \times Psz=0.68 \times 200=135 \qquad (26)$$

Next, based on the size of the EPG slot determined by the equation 26, it is checked how many characters are required to be placed in the slot. Then the size of the characters are changed in accordance with the result of the check and then the characters with the size as changed are displayed in the EPG slot. Referring back to FIG. 16, the flow of the above-described operation will be described.

First, a character string such as a program title in the EPG data is read out (step S161). A number of characters Pc in the program title is then counted (step S162). Further, a number of characters Pg in additional information such as a sub-title is counted (step S163). Then, the total number of the characters to be displayed is calculated (step S164). Then the sizes of the characters are determined from the total number of the characters and the size of the EPG slot determined by the equation 8.

In this determination, first the number of characters is selected from the larger ranking the number of characters Pc in the program title and the number of characters Pg in the sub-title. The size of the EPG slot Pu is divided by the selected one of the number of characters by the following equation 27 (step S165).

$$Fsz=Pu/\text{Max}(Pc|Pc+Pg) \qquad (27)$$

The result Fsz of the equation 27 is compared with a threshold value Fmin of the minimum character size stored in the main memory 25 (step S166). When the Fsz is greater then the Fmin, characters with the font-size nearest to the Fsz are used for the EPG (step S167). If the Fsz is smaller than the Fmin, first the number of characters Pc in the program title and the number of characters Pg in the sub-title are compared with each other. If the Pc is smaller than the Pg, the value Fsz is again calculated by the following equation 28 (steps S168, S169).

$$Fsz=Pu/Pc \qquad (28)$$

Here, the reason that the number of characters Pc in the program title is used for the determination of the Fsz is because of that the program title is more important for viewers than the additional program information such as the sub-title. Here, again the value Fsz and the Fmin are compared with each other (step S166). If the value Fsz is greater than the Fmin, characters with the font-size nearest to the Fsz are used for the EPG slot (step S167).

If the value Fsz is yet smaller than the Fmin in the step S166, the display of character string in the EPG slots is given up and the slots are left in a blank (step S170).

Then, it is determined whether the character display processing has been carried out for EPG slots. If there remains any EPG slot unfinished the character presentation, the operation repeats the routine on and after the step S155 (step S171).

As is evident from the flow of steps as described above, the present embodiment can present a lot of program information in the EPG slots when the size of the slots had been reduced, since although the EPG slots are companded in only the time-axis direction by the non-linear processing the size of the characters is reduced in tied to the size of the EPG slots.

Now a seventh embodiment of the present invention will be explained hereinafter. Here, a process for shifting the start position on the EPG screen according to the non-linear processing will be explained.

Figure 21A:
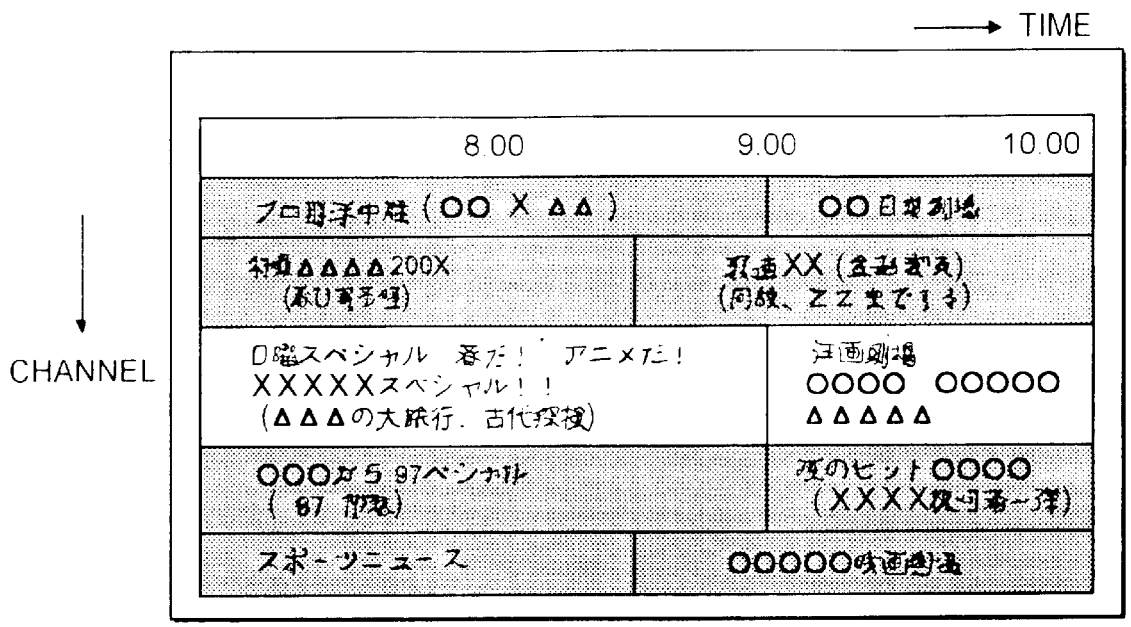
FIG. 21a is a diagram showing the EPG screen according to a seventh embodiment.
Figure 21B:
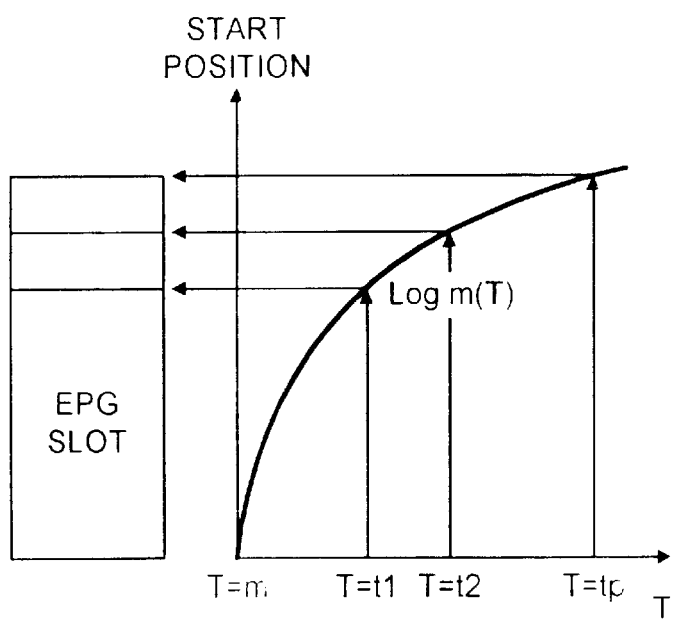
Figure 22:
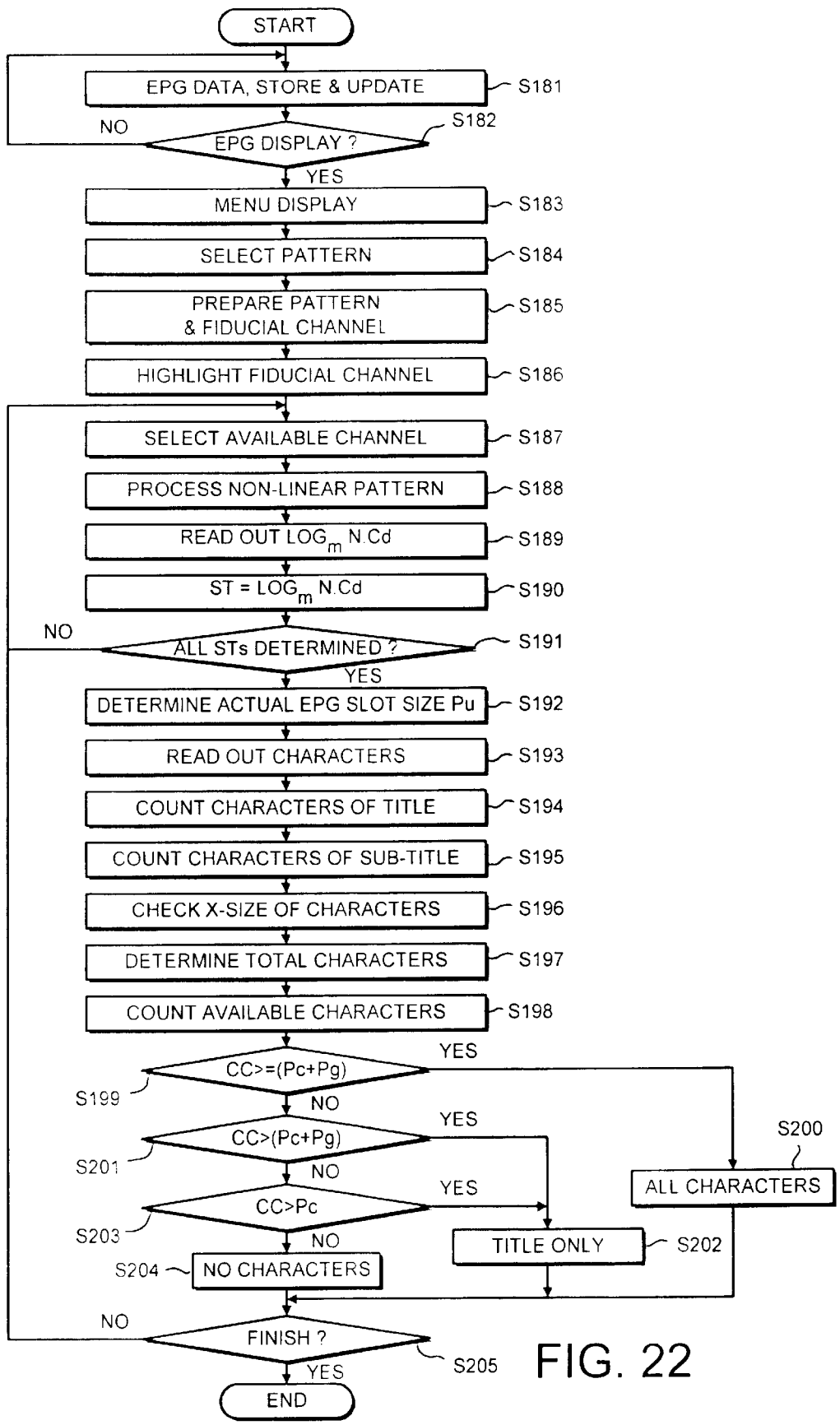
FIG. 22 is a flowchart showing the steps of the EPG screen processing according to the seventh embodiment.
Figure 23:
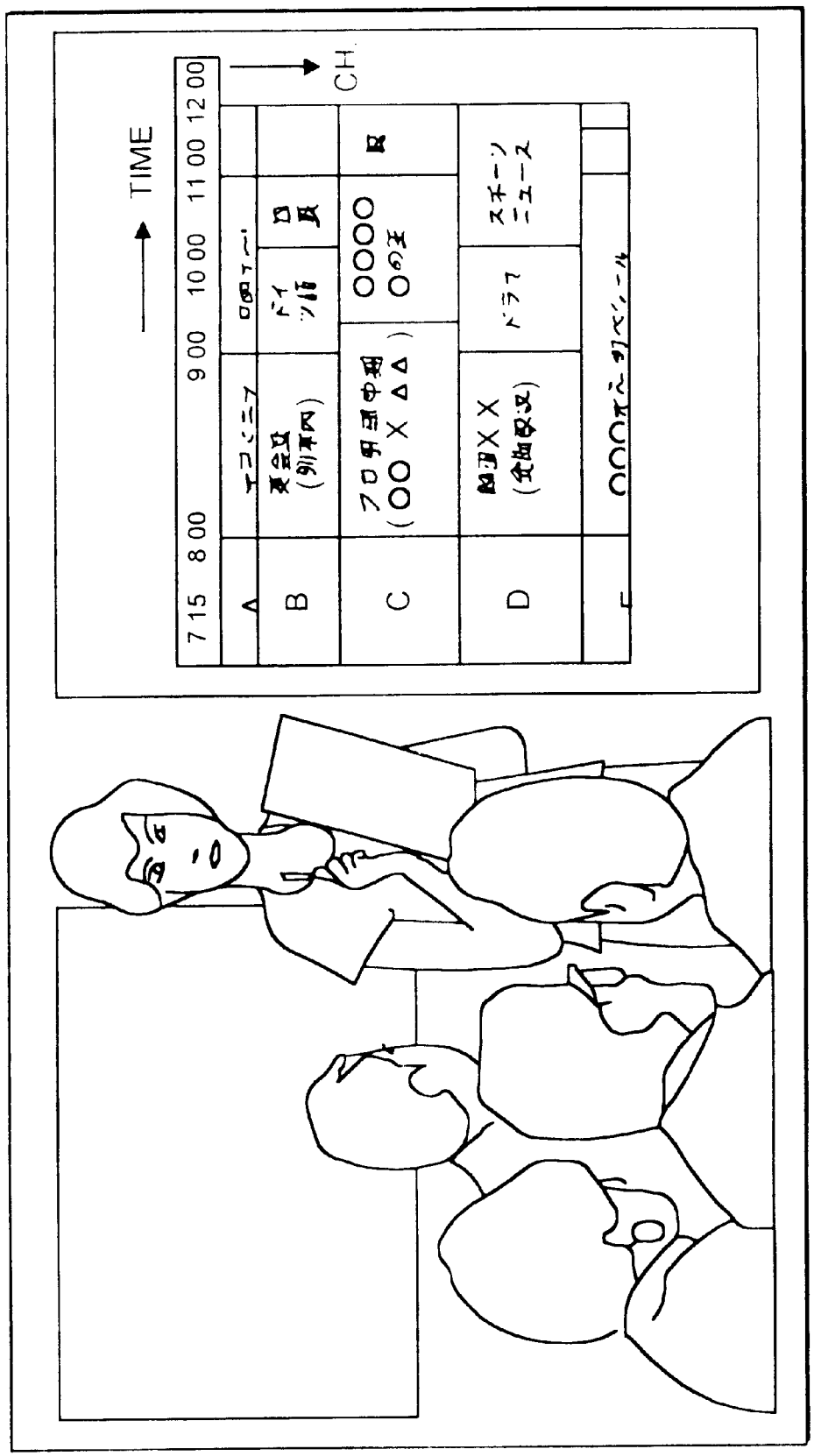
FIG. 23 is a diagram showing another example of the EPG screen applied to a double-window display according to the seventh embodiment.

FIGS. 21a and 21b an example that the start position of the EPG slots on the EPG screen is compressed in a non-linear manner in the channel-list axis direction, and that the number of characters available in the EPG slot is variable. FIG. 21a shows the EPG screen according to this seventh embodiment and FIG. 21b shows the relation between the non-linear logarithmic curve and the size of the EPG slots. FIG. 22 shows the flow of operation steps for displaying the non-linear patterned EPG screen according to the seventh embodiment. FIG. 23 shows an example of such a double-window display to which the operation of FIG. 22 is adapted.

In FIG. 22, the EPG data from the TV station and the present time data are updated and stored in the step S181. When the viewer selects the EPG screen (step S182), a menu screen listing display patterns is presented (step S183). The viewer then selects his/her favorite display pattern (step S184). A non-linear processing routine corresponding to the selected display pattern is prepared. Further at a beginning of the operation, a channel slot corresponding to the channel that is currently received by the viewer is defined (step S185). Then the channel slot of the channel number or the TV station name is highlighted as shown in FIG. 21a (step S186).

On the other hand, a channel number data of an available channel is extracted from the EPG data (step S187). The channel number data is then used in the non-linear processing routine (step S188). In the non-linear processing routine, a logarithmic function $Log_m$ Cd is read out from a memory (the base m of the logarithmic function Log is set to any number, while its coefficient N is also set to any number) (step S189). Then a start position St of each of the EPG slot is determined by the following equation 29 (step S190). The operation of the steps S187 through S190 is repeated until the start positions St of all EPG slots have been determined (step S71).

$$St = Log_m\ N(abs(Cp-Cn)) \qquad (29)$$

The relation of the start position St determined by the equation 29 and the time has a logarithmic function Log, as shown in FIG. 21b.

Next, based on the start position of the EPG slot determined by the equation 29, the size of the EPG slot is determined. Further, it is checked how many characters can be placed in the slot. Then, based on the result, necessary characters are displayed in the EPG slot. Referring back to FIG. 22, the flow of the above-described operation will be described.

First, the size of the EPG slot Pu is determined from the difference between the start position St0 of the EPG slot and the start position St1 of the following EPG slot (step S192).

$$Pu = St1 - St0 \qquad (30)$$

Further, a character string such as a program title is extracted from the EPG data (step S193). A number of characters Pc in the program title is then counted (step S194). Further, a number of characters Pg in additional information such as a sub-title is counted (step S195). First, for the number of characters obtained in the step S193, the number of displayable characters is checked from the size determined by the equation 30.

First in this operation, in the case that the character size is fixed, the pixel size Cs of the character in the X direction (i.e., the time-axis direction on the EPG screen) is checked (step S196). When a gap (blank) Gp is required between characters, the size Cp of each character including the gap Gp in the X direction will be determined by the following equation 31 (step S197).

$$Cp = Cs + Gp \qquad (31)$$

Then the number of displayable characters CC is determined by dividing the slot size Pu determined by the equation 30 by the character size Cp determined by the equation 31, as shown by the following equation 32 (step S198).

$$CC = Pu/Cp \qquad (32)$$

Then a character string available in the EPG slot is decided (steps S199, S201, and S202) by comparing the number of characters Pc (or Pc+Pg) obtained in the step S77 with the number of displayable characters CC calculated by the equation 32 (steps S200, S202, and S204).

If "CC>=(Pc+Pg)" is positive (step S199), then a whole character string display will be carried out (step S200).

If "CC<(Pc+Pg) && CC>=PC" is positive (step S201), only a program title display will be carried out (step S202).

If "CC<PC" is positive (step S203), no character display will be carried out (step S204).

Then, it is determined whether the character display processing has been carried out for EPG slots. If there remains any EPG slot unfinished the character presentation, the operation repeats the routine on and after the step S187 (step S205).

As is evident from the flow of steps as described above, according to the present embodiment, since the start position of the EPG screen is companded in the channel-list axis direction by the non-linear processing, and the number of characters available in the EPG slot is made variable, it can provide viewers an EPG screen with the easily readable pattern in accordance with the size of the EPG slots.

Next the eighth embodiment of the present invention will be explained hereinafter. Here, in this eighth embodiment the start position on the EPG screen according to the non-linear processing is shifted, and the character size varies in accordance with the size of the EPG slot.

Figure 24A:
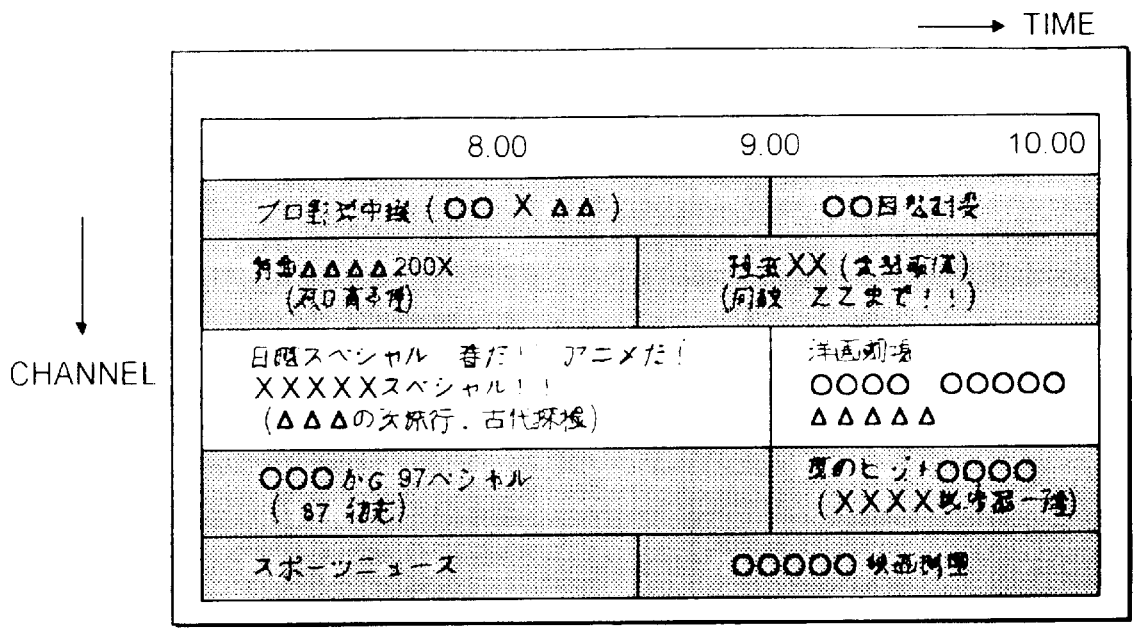
FIG. 24a is a diagram showing the EPG screen according to the eighth embodiment.
Figure 24B:
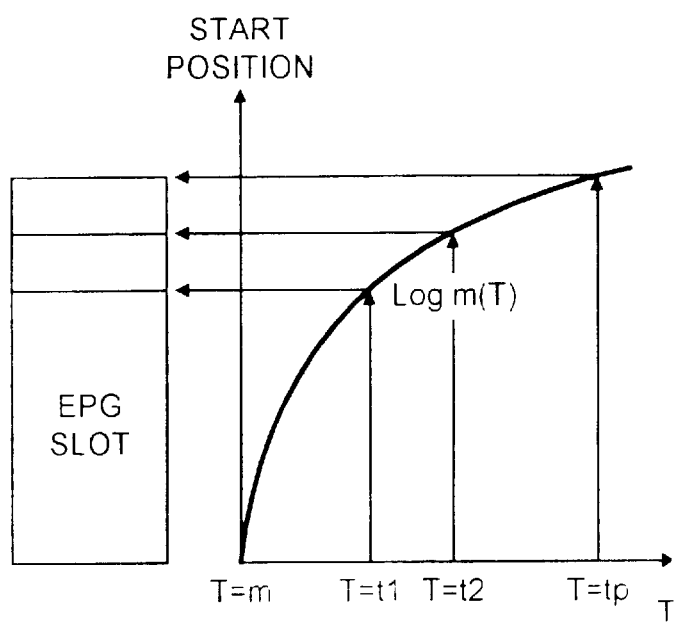
Figure 25:
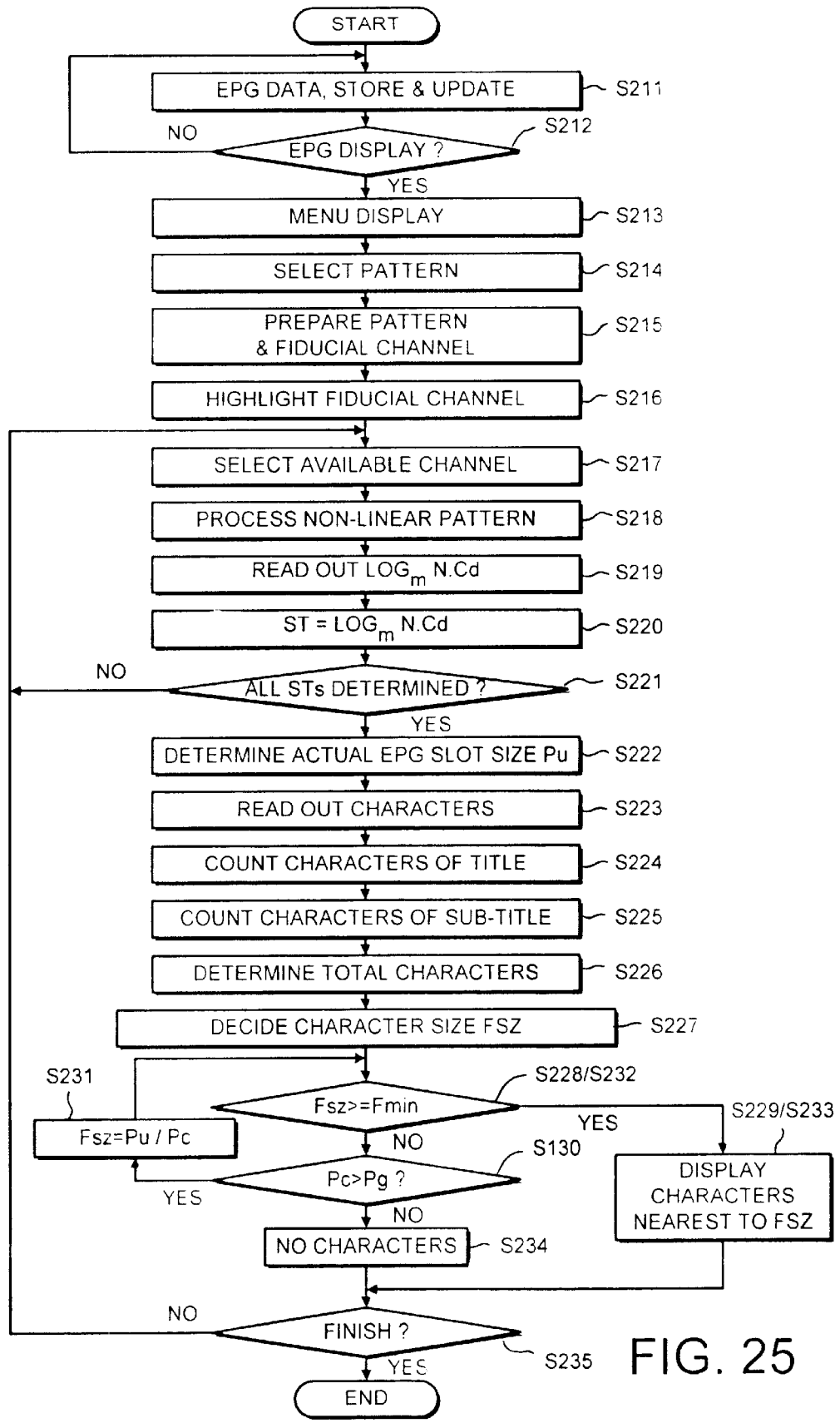
FIG. 25 is a flowchart showing the steps of the EPG screen processing according to an eighth embodiment.
Figure 26:
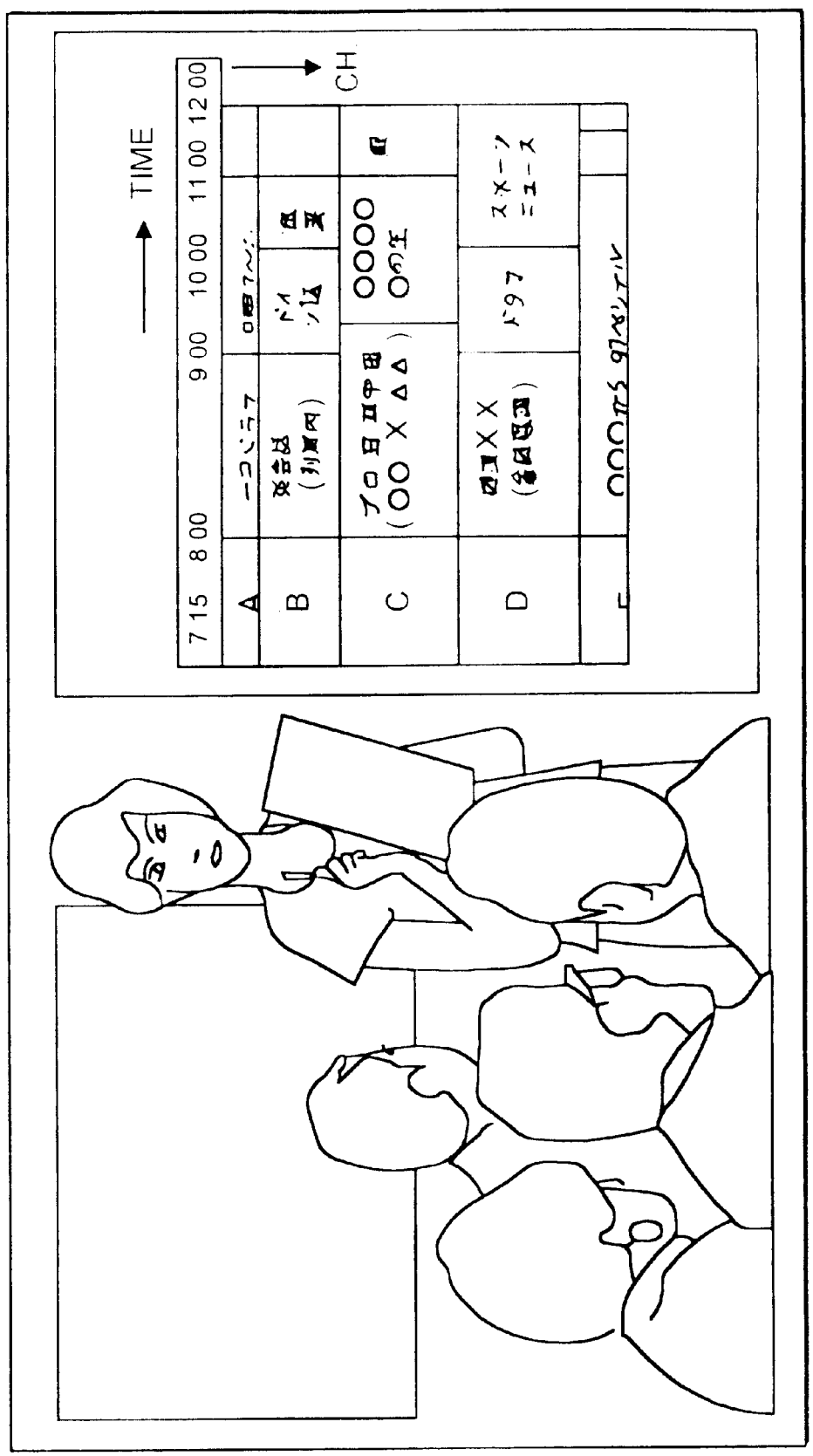
FIG. 26 is a diagram showing another example of the EPG screen applied to a double-window display according to the eighth embodiment.

FIGS. 24a and 24b an example that the start position of the EPG slots on the EPG screen is compressed in a non-linear manner in the channel-list axis direction, and that the number of characters available in the EPG slot is variable. FIG. 24a shows the EPG screen according to this eighth embodiment and FIG. 24b shows the relation between the non-linear logarithmic curve and the size of the EPG slots. FIG. 25 shows the flow of operation steps for displaying the non-linear patterned EPG screen according to the eighth embodiment. FIG. 26 shows an example of such a double-window display to which the operation of FIG. 25 is adapted.

In FIG. 25, the EPG data from the TV station and the present time data are updated and stored in the step S211. When the viewer selects the EPG screen (step S212), a menu screen listing display patterns is presented (step S213). The viewer then selects his/her favorite display pattern (step S214). A non-linear processing routine corresponding to the selected display pattern is prepared. Further at a beginning of the operation, a channel slot corresponding to the channel that is currently received by the viewer is defined (step S215). Then the channel slot of the channel number or the TV station name is highlighted as shown in FIG. 24a (step S216).

On the other hand, a channel number data of an available channel is extracted from the EPG data (step S217). The channel number data is then used in the non-linear processing routine (step S218). In the non-linear processing routine, a logarithmic function $Log_m$ Cd is read out from a memory (the base m of the logarithmic function Log is set to any number, while its coefficient N is also set to any number) (step S219). Then a start position St of each of the EPG slot is determined by the following equation 33 (step S220). The operation of the steps S217 through S220 is repeated until the start positions St of all EPG slots have been determined (step S221).

$$St = \text{Log}_m N(abs(Cp-Cn)) \tag{33}$$

The relation of the start position St determined by the equation 33 and the time has a logarithmic function Log, as shown in FIG. 24b.

Next, based on the start position of the EPG slot determined by the equation 33, the size of the EPG slot is determined.

Further, from the total number of the characters to be displayed, the size of characters to be included in the EPG slot is determined. Then based on the result available characters are displayed in the EPG slot. Referring back to FIG. 25, the flow of the above-described operation will be described.

First, the size of the EPG slot Pu is determined from the difference between the start position St0 of the EPG slot and the start position St1 of the following EPG slot (step S222).

$$Pu = St1 - St0 \tag{34}$$

Then, a character string such as a program title is extracted from the EPG data (step S223). A number of characters Pc in the program title is then counted (step S224). Further, a number of characters Pg in additional information such as a sub-title is counted (step S225). Then, the total number of the characters to be displayed is calculated (step S226). Then the sizes of the characters are determined from the total number of the characters and the size of the EPG slot determined by the equation 34.

In this determination, first the number of characters is selected from the larger ranking the number of characters Pc in the program title and the number of characters Pg in the sub-title. The size of the EPG slot Pu is divided by the selected one of the number of characters by the following equation 35 (step S227).

$$Fsz = Pu / \text{Max}(Pc|Pc+Pg) \tag{35}$$

The result Fsz of the equation 17 is compared with a threshold value Fmin of the minimum character size stored in the main memory 25 (step S228). When the Fsz is greater then the Fmin, characters with the font-size nearest to the Fsz are used for the EPG (step S229). If the Fsz is smaller than the Fmin, first the number of characters Pc in the program title and the number of characters Pg in the sub-title are compared with each other (step S230). If the Pc is smaller than the Pg, the value Fsz is again calculated by the following equation 35 (step S231).

$$Fsz = Pu / Pc \tag{36}$$

Here, the reason that the number of characters Pc in the program title is used for the determination of the Fsz is because the program title is more important for viewers than the additional program information such as the sub-title. Here, again the value Fsz and the Fmin are compared with each other (step S232). If the value Fsz is greater than than the Fmin, characters with the font-size nearest to the Fsz are used for the EPG slot (step S233).

If the value Fsz is yet smaller than the Fmin in the step S232, the display of character string in the EPG slots is given up and the slots are left in a blank (step S234).

Then, it is determined whether the character display processing has been carried out for EPG slots. If there remains any EPG slot unfinished the character presentation, the operation repeats the routine on and after the step S215 (step S235).

As is evident from the flow of steps as described above, according to the present embodiment, since the start position of the EPG screen is compressed in the channel-list axis direction by the non-linear processing, and the character size is made variable, it can provide viewers an EPG screen with the easily readable pattern in accordance with the size of the EPG slots.

Figure 27:
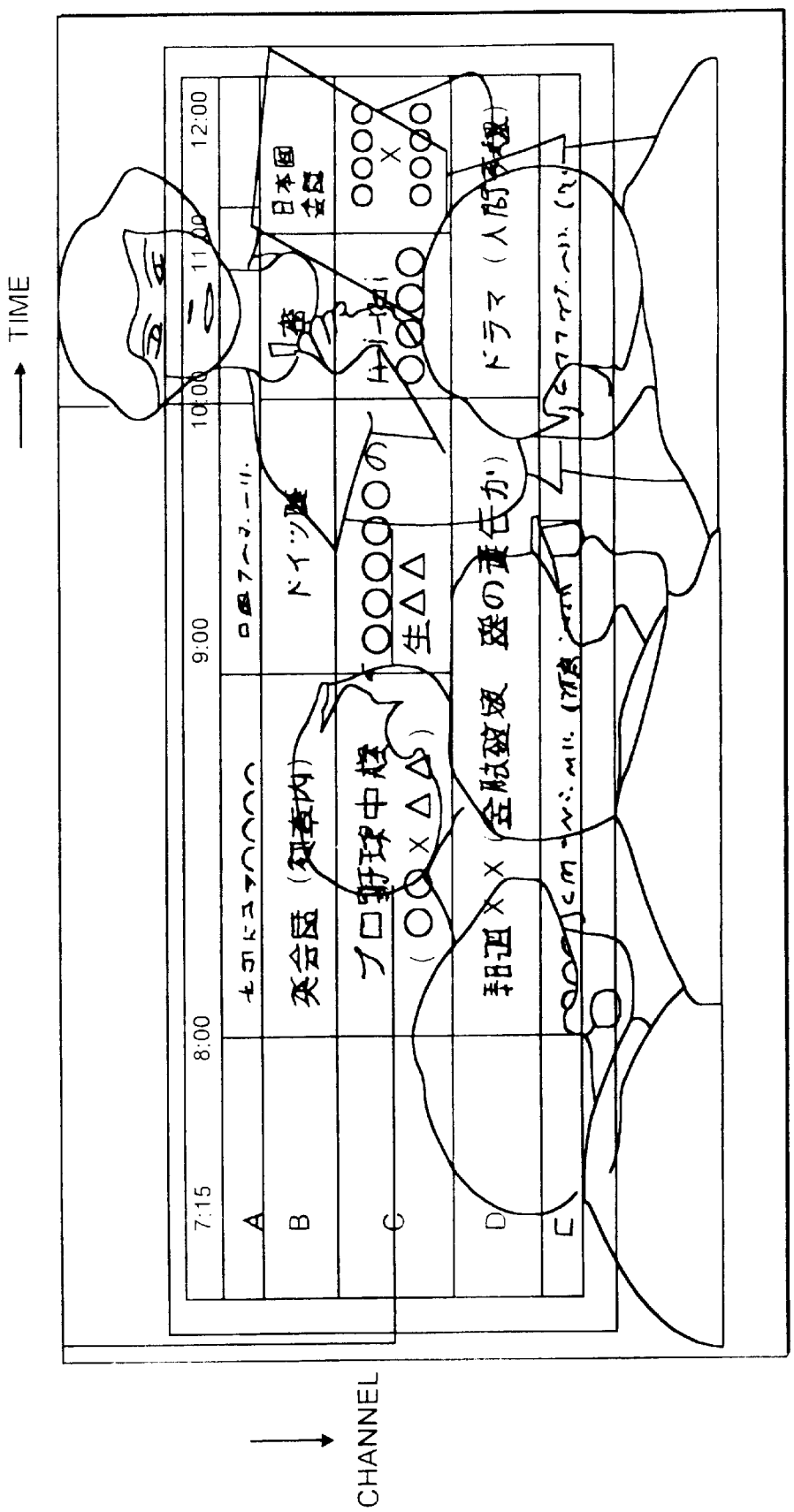
FIG. 27 is a diagram showing the EPG screen of its time-axis and channel-list axis processed complexly in the non-linear change pattern.

The present invention is not limited to the above-described embodiments. For example, in the EPG screen both of its time-axis and channel-list axis be processed in the non-linear change pattern, as shown in FIG. 27. Further, for instance, in the case that the character size is made variable, the main-title and the additional information such as the sub-title can have different font size with each other.

As is evident from the above explanations, according to the embodiments of the present invention, in displaying EPG information of the multi-channel broadcast it is possible to provide the EPG screen with program information of not only programs starting within two or three hours from present time, but also programs starting at time apart more than a half of a day from the present time. Further, it can provide viewers an easily readable EPG screen.

As described above the present invention provides an extremely preferable electronic preview guide display system capable of increasing an amount of information given in at least one of the directions of the time-axis direction and the channel-list axis of an EPG screen, while in a pattern easily readable for viewers.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the application as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An electronic preview guide (EPG) display apparatus for use in a broadcast receiver, for selectively presenting viewers a broadcast schedule in a grid pattern with one or more rows each showing a TV channel number or a TV station name and an array of slots containing preview guide messages of the broadcast schedule extending in a direction of time axis, by using a preview guide data broadcast by each broadcast station and a present time, comprising a display controller for making an EPG slot at the present time or a viewer designated time wider than other slots of the EPG screen, wherein the display controller calculates a time difference between the present time or the viewer-designated time and the program start time, and then based on the calculated time difference, compresses the size of the slots in the EPG screen in a non-linear manner in the time-axis direction, so as to automatically change the amount of information to be displayed according to the size of the EPG slot in which the non-linear processing is performed.

2. An electronic preview guide display apparatus as claimed in claim 1, wherein at the time of displaying the preview guide screen beginning at the present time or the viewer-designating time, the non-linear processing of the time axis in the display controller uses one of $1/\text{Log}_m$ (N×Ts), $1/\exp$ (N×Ts), $1/$(N×Ts), or $\text{Log}_m$ (N×Ts) as a compression rate for the EPG slot at the starting time (Ts) of a program to be displayed, wherein a base m of the logarithmic function, Log, and the coefficient N are optional.

3. An electronic preview guide display apparatus as claimed in claim 1, wherein the display controller includes a selector with which viewers are able to voluntarily select the display processed in the non-linear manner.

4. An electronic preview guide display apparatus as claimed in claim 1, wherein the display controller includes a first counter for counting a number of displayable characters per program in the case that the character size used for the preview guide display is fixed, and a second counter for counting a program title and the number of displayable characters per additional information from the relation of the character size and the size of the slot in one program display, the display controller displays each program title obtained from the first and the second counter and characters according to the information about the number of displayable characters per additional information in the Program information slot.

5. An electronic preview guide display apparatus as claimed in claim 4, wherein the display controller displays all data in the case that the total number of the characters displayable in the program information slot is more than the character number per program stored in the preview guide data, displays only the program title in the case that the total characters is less than the characters per program stored in the preview guide data but more than the characters of the program title, and displays the displayable character or displays no character in the case that the total character number is less than the characters of the program title.

6. An electronic preview guide display apparatus as claimed in claim 1, wherein the display controller includes a counter for counting the display characters per program in the case that the character size used for the preview guide display is variable, a character size decision means for deciding the character size from the relation of the number of displayable characters obtained from the counting means and a program information slot size, and a character controller for controlling whether to display additional information in the case that the character size decided by the counting means is smaller than the size which has been set up already, or to not to display any character in the case that the title unable to be displayed.

7. An electronic preview guide (EPG) display apparatus for selectively displaying a program viewing schedule, the program viewing schedule having an axis showing a channel list and a time axis and defining a plurality of EPG slots corresponding to available programs, the electronic preview guide display apparatus having a display controller for displaying a reference EPG slot with a dimension greater than other displayed EPG slots, the dimensions of the slots being based on the proximity in the program viewing schedule of the slots to the reference EPG slot, wherein the display controller determines the dimensions of the displayed EPG slots in the direction of the time axis based on non-linear, logarithmic processing of the time difference between the time of the reference EPG slot and the program time of the other displayed EPG slots.

8. An electronic preview guide display apparatus as claimed in claim 7, wherein the display controller determines the dimensions of the displayed EPG slots in the channel axis direction based on non-linear, logarithmic processing of the difference in the channel axis direction of the program viewing schedule between the channel of the reference slot and the channel of the other displayed slots.

9. An electronic preview guide display apparatus as claimed in claims 1 or 7, wherein the display controller compresses the dimensions of other displayed slots relative to the reference slot in accordance with one of the compression rates $1/\text{Log}_m$ (N×Ts), $1/\exp$ (N×Ts), $1/$(N×Ts) or $\text{Log}_m$ (N×Ts), where the base m of the Log function and N can be any number, and Ts represents the proximity of the displayed slot to the reference slot.

10. An electronic preview guide display apparatus as claimed in 9, wherein information displayed in each of the displayed slots is determined based upon the calculated dimensions of the slot.

11. An electronic preview guide display apparatus as claimed in claim 9, wherein the size of the characters displayed in each of the displayed slots is determined based upon the calculated dimensions of the slot.

12. An electronic preview guide display apparatus as claimed in claim 9, wherein the reference slot is the slot at the present time or at a viewer designated time and at the presently received channel or a viewer designated channel.

* * * * *